United States Patent
Wei et al.

(10) Patent No.: US 12,099,009 B2
(45) Date of Patent: Sep. 24, 2024

(54) METHOD AND APPARATUS FOR SURFACE PLASMON RESONANCE IMAGING

(71) Applicant: ACADEMIA SINICA, Taipei (TW)

(72) Inventors: Pei-Kuen Wei, Taipei (TW);
Ming-Yang Pan, Taipei (TW);
Kuang-Li Lee, Keelung (TW)

(73) Assignee: ACADEMIA SINICA, Taipei (TW)

( * ) Notice: Subject to any disclaimer, the term of this patent is extended or adjusted under 35 U.S.C. 154(b) by 426 days.

(21) Appl. No.: 17/282,163

(22) PCT Filed: Oct. 3, 2019

(86) PCT No.: PCT/US2019/054553
§ 371 (c)(1),
(2) Date: Apr. 1, 2021

(87) PCT Pub. No.: WO2020/072809
PCT Pub. Date: Apr. 9, 2020

(65) Prior Publication Data
US 2022/0011228 A1    Jan. 13, 2022

Related U.S. Application Data

(60) Provisional application No. 62/741,172, filed on Oct. 4, 2018.

(51) Int. Cl.
*G01N 21/552* (2014.01)

(52) U.S. Cl.
CPC ................................. *G01N 21/553* (2013.01)

(58) Field of Classification Search
CPC .................................................... G01N 21/553
USPC ............................................................ 356/445
See application file for complete search history.

(56) References Cited

U.S. PATENT DOCUMENTS

| | | |
|---|---|---|
| 6,493,097 B1 | 12/2002 | Ivarsson |
| 6,570,657 B1 | 5/2003 | Hoppe et al. |
| 6,738,141 B1 | 5/2004 | Thirstrup |
| 6,862,094 B2 | 3/2005 | Johansen |
| 7,030,989 B2 | 4/2006 | Yager et al. |
| 7,576,863 B2 | 8/2009 | Weibel |
| 7,652,768 B2 | 1/2010 | Kuroda et al. |
| 7,839,508 B2 | 11/2010 | Nishikawa et al. |

(Continued)

FOREIGN PATENT DOCUMENTS

| | | | | |
|---|---|---|---|---|
| CN | 104730038 B | 2/2018 | | |
| GB | 2462606 A | * | 2/2010 | ........... G01N 21/553 |

OTHER PUBLICATIONS

Coskun et al., "Lensfree optofluidic plasmonic sensor for real-time and label-free monitoring of molecular binding events over a wide field-of-view," Scientific Reports, vol. 4, Oct. 27, 2014, 7 pages.

(Continued)

*Primary Examiner* — Sunghee Y Gray
(74) *Attorney, Agent, or Firm* — MUNCY, GEISSLER, OLDS & LOWE, P.C.

(57) ABSTRACT

A method and apparatus for surface plasmon resonance imaging are provided for imaging the surface plasmon resonance signals caused by the interaction of biomolecules. In particular, the method and apparatus can image the slightly spectral change in a surface plasmon resonance mode by comparing the light intensities of two bands in the frequency domain of the surface plasmon.

13 Claims, 18 Drawing Sheets

(56) References Cited

U.S. PATENT DOCUMENTS

| | | | |
|---|---|---|---|
| 2003/0219809 A1 | 11/2003 | Chen et al. | |
| 2004/0114145 A1 | 6/2004 | Thirstrup | |
| 2008/0129981 A1* | 6/2008 | Nolte | G01N 21/45 |
| | | | 356/36 |
| 2011/0166045 A1* | 7/2011 | Dhawan | H01L 29/068 |
| | | | 257/467 |
| 2018/0263489 A1* | 9/2018 | Gavaris | A61B 3/145 |

OTHER PUBLICATIONS

Pan et al., "Resonant position tracking method for smartphone-based surface plasmon sensor," Analytica Chimica Acta, vol. 1032, May 12, 2018, 8 pages.

Cetin et al., "Plasmonic Sensor Could Enable Label-Free DNA Sequencing," ACS Sensors, vol. 3, No. 3, Feb. 28, 2018, 8 pages.

Yeatman et al., "Surface Plasmon Microscopy," Electronics Letters, vol. 23, No. 20, Aug. 5, 1987, 2 pages.

B.A. Prabowo et al., "Surface Plasmon Resonance Optical Sensor: A Review on Light Source Technology," Biosensors, Aug. 26, 2018, retrieved Nov. 24, 2019 from internet <https://www.ncbi.nlm.nih.gov/pmc/articles/PMC6163427/pdf/biosensors-08-00080.pdf>, 27 pages.

Kuang-Li Lee et al., "Aluminum Nanostructures for Surface-Plasmon-Resonance-Based Sensing Applications," ACS Applied Nano Materials, 2019, 2, pp. 1930-1939.

Ming-Yang Pan et al., "Spectral contrast imaging method for mapping transmission surface plasmon images in metallic nanostructures," Biosensors and Bioelectronics 142, Jul. 28, 2019, 9 pages.

E. Yeatman et al., "Surface plasmon microscopy," Electronics Letters, 23, 1987, Abstract, 1 page.

\* cited by examiner

METHOD AND APPARATUS FOR SURFACE PLASMON RESONANCE IMAGING

BACKGROUND

Technology Field

The present disclosure relates to the measurement of surface plasmon resonance signals and, in particular, to a method and apparatus for imaging the slightly spectral change of a surface plasmon resonance mode in the frequency domain.

Description of Related Art

The surface plasmon sensing system is usually applied to detect the target molecules. When the target biomolecule interacts with the receptor molecule on the plasma sensor, the surface refractive index thereof can be changed, and the change can be measured based on the angle or frequency (wavelength) of the surface plasmon resonance mode, which is usually at the dips of intensity-angle and intensity-wavelength. By monitoring the signal in real-time, the measuring figure of the signal variations upon time can be obtained, which can be used to further analyze the affinity between the target molecule and the receptor. The surface plasmon resonance imaging method is capable of real-time, label-free and high-throughput detection for many sensing applications, so this method is usually used in the biological detection field.

With the development of the biological or pharmaceutical field, the demand for high-throughput detection is rapidly increasing, such as biomarker exploration, clinical detection and ligand display. However, the development of high-throughput surface plasmon systems is hindered because of the integration of the imaging system and the angle or wavelength analysis device is extremely difficult. For example, the frequency domain sensitive detection method uses a broadband light beam to illuminate a surface plasmon sensor, and the reflected or transmitted light is split by a prism or a grating. Then, the intensity of each frequency domain is analyzed by a one-dimensional or two-dimensional photodetector, and the surface plasmon signal response can be determined by tracking the dips or peaks on the spectrum. The angle sensitive detection method uses a single-frequency light source, which is incident to the surface plasmon sensor by different wavelengths, and the intensity of each angle is analyzed by the one-dimensional or two-dimensional photodetector. Thus, the surface plasmon signal response can be determined by tracking the dips or peaks of the light intensities in different angles. These methods can only measure the signal of a single point on the surface plasma sensor. If it is necessary to measure the signals of multiple points, an additional position scanning device must be added, which not only affects the complexity of the entire surface plasmon system, but also increases the measuring time (additional scanning time) that can limit the temporal resolution. Thus, a system and method for surface plasmon imaging is quite desired.

The first system combining surface plasmon sensing and imaging is disclosed by Yeatman in 1987. In this system, a linear scanning focused light beam is provided to excite surface plasmon waves. A dielectric film (with a thickness of 2.5 nm) is imaged through a camera by measuring the intensity of the reflected light in these scanned areas. A year later, Rothenhausler demonstrated a surface plasmon imaging microscopy that does not require the scanning step. An expanded laser beam is used to excite surface plasma waves, which are directly imaged by the camera, and the refractive indexes can be reflected in the intensities within the image. There are many devices implemented based on this method, such as SPRimager® (GWC Technology, referred to U.S. Pat. No. 6,862,094 B2 China patent No. 104730038B). Another method of surface plasmon imaging is to add a scanning device to the system. Bengt Ivarsson et al. proposed a method for examining thin layer structures on a (sensor) surface (see U.S. Pat. No. 6,493,097 B1), wherein two detectors are used to detect surface plasmon signals in different areas. Lutz Hoppe et al. used a self-made mask in the surface plasmon system (see U.S. Pat. No. 6,570,657 B1), wherein the incident light was projected through the mask onto different positions of the plasmon sensor on the surface of prism for providing multi-point surface plasmon sensing. Carsten Thirstrup, in U.S. Pat. No. 6,738,141 B1, disclosed a complete surface plasmon imaging system in which a reflective diffractive optical element is used to generate linear light focusing to different areas on the surface plasmon sensor, thereby generating the surface plasmon image. Stephen C. Weibel proposed a surface plasmon imaging device (see U.S. Pat. No. 7,576,863 B2) that illuminates a surface plasma sensor with a single-frequency light source and uses double lenses to scan the light angle, thereby generating the surface plasmon image based on the angle-related surface plasmon signals. In addition to the angle-related and frequency-related methods, the surface plasmon signals can also be imaged by using the phase difference method. Chen Shean-Jen et al., in US2003/0219809A1, proposed a surface plasmon imaging apparatus based on Mach-Zehnder interferometry. In this patent, the s-wave is used as a reference signal, the p-wave is used to detect the refractive index, and an image with a spatial frequency can be presented by combining the s-wave and the p-wave.

As mentioned above, there are three types of surface plasmon imaging technologies including the wavelength/angle/position scanning type, single-frequency type, and interference type. However, the scanning type surface plasmon imaging technology needs additional scanning time, which may cause poor temporal resolution and thus is not suitable for detecting the high affinity molecule reaction. The single-frequency type surface plasmon imaging technology is limited by the detection means of light intensity differences. Since the light intensity is easily interfered by multiple noises, including thermal disturbances and vibrations, the detection limitation of the single-frequency type surface plasmon imaging technology is worse than the angle or wavelength methods. The interference type surface plasmon imaging technology provides the best detection limitation, but the optical path system thereof is more complex. Thus, a very stable optical environment is required, and the detection dynamic region is narrower, thereby limiting the target molecular size for measurement.

SUMMARY

This disclosure provides a method and apparatus for surface plasmon imaging without dispersive components, which are based on spectral contrast and can be applied to any surface plasmon sensors (e.g. the extraordinary transmission-type, prism-type or local-type surface plasmon resonance sensors). The images of the sensors are sensed in two different spectral bandwidths for presenting the surface plasmon signal images. The advantages of this disclosure comprise: (1) capable of measuring the extraordinary transmission-type, prism-type, and local-type surface plasmon resonance sensors for providing the surface plasmon signal images; (2) unnecessary to install the dispersive component and scanning mechanism, so that the system is simpler and the temporal resolution of the obtained data can be increased; (3) providing wider detection dynamic region of the surface plasmon signals, which is suitable for measuring biomolecules, by comparing the images of two spectral bandwidths; (4) reducing the intensity noises by comparing the images of two spectral bandwidths so as to increase the detection limit; and (5) suitable for various imaging systems such as scanner, microscope or smart phone.

The present disclosure provides an apparatus for surface plasmon resonance imaging, which comprises a surface plasmon resonance sensing chip, an imaging module and an image processing unit. The surface plasmon resonance sensing chip has a surface plasmon resonance wavelength. The imaging module is configured to receive a first bandwidth plasmon resonance light beam and a second bandwidth plasmon resonance light beam for generating a first bandwidth surface plasmon image signal and a second bandwidth surface plasmon image signal, respectively. The image processing unit is coupled to the imaging module and receives the first bandwidth surface plasmon image signal and the second bandwidth surface plasmon image signal for generating a surface plasmon signal image. The surface plasmon resonance wavelength is less than a minimum wavelength of the first bandwidth plasmon resonance light beam and greater than a maximum wavelength of the second bandwidth plasmon resonance light beam. A difference between the surface plasmon resonance wavelength and the minimum wavelength of the first bandwidth plasmon resonance light beam is less than 10 nm, and a difference between the surface plasmon resonance wavelength and the maximum wavelength of the second bandwidth plasmon resonance light beam is less than 10 nm.

In one embodiment, the first bandwidth plasmon resonance light beam and the second bandwidth plasmon resonance light beam can be both reflected light beams, or they can be both transmitted light beams.

In one embodiment, the surface plasmon resonance wavelength of the surface plasmon resonance sensing chip changes along with a surface environmental refractive index.

In one embodiment, the surface plasmon resonance sensing chip comprises a periodic metallic nanostructure.

In one embodiment, the surface plasmon resonance sensing chip is a transmission-type surface plasmon resonance sensing chip or a reflection-type surface plasmon resonance sensing chip.

In one embodiment, the surface plasmon signal image is obtained by the image processing unit according to an equation of:

$$\text{the surface plasmon signal image} = \frac{\text{first bandwidth surface plasmon image signal} - \text{second bandwidth surface plasmon image signal}}{\text{first bandwidth surface plasmon image signal} + \text{second bandwidth surface plasmon image signal}}.$$

In one embodiment, the apparatus further comprises a light source module for emitting a first bandwidth incident light beam and a second bandwidth incident light beam, wherein the surface plasmon resonance sensing chip is configured to receive the first bandwidth incident light beam and the second bandwidth incident light beam for correspondingly generating the first bandwidth plasmon resonance light beam and the second bandwidth plasmon resonance light beam, respectively.

In one embodiment, the light source module comprises a first bandwidth light emitting unit, a second bandwidth light emitting unit, and a switch unit. The first bandwidth light emitting unit emits the first bandwidth incident light beam, and the second bandwidth light emitting unit emits the second bandwidth incident light beam. The switch unit couples to the first bandwidth light emitting unit and the second bandwidth light emitting unit for switching between the first bandwidth light emitting unit and the second bandwidth light emitting unit.

In one embodiment, the apparatus further comprises a spectral modulation module comprising a first bandwidth filter and a second bandwidth filter. The spectral modulation module receives a broadband light beam to generate a first bandwidth incident light beam and a second bandwidth incident light beam, and the surface plasmon resonance sensing chip is configured to receive the first bandwidth incident light beam and the second bandwidth incident light beam for correspondingly generating the first bandwidth plasmon resonance light beam and the second bandwidth plasmon resonance light beam, respectively.

In one embodiment, the spectral modulation module further comprises a switch unit coupling to the first bandwidth filter and the second bandwidth filter for switching the first bandwidth filter and the second bandwidth filter in an incident path from the broadband light source to the surface plasmon resonance sensing chip.

In one embodiment, the broadband light beam is generated by a white light source.

In one embodiment, the white light source comprises a white light LED, a halogen lamp, a tungsten lamp, or a xenon lamp.

In one embodiment, the imaging module comprises an imaging unit and a lens, the lens is located between the surface plasmon resonance sensing chip and the imaging unit, and the first bandwidth plasmon resonance light beam and the second bandwidth plasmon resonance light beam pass through the lens and are then projected on the imaging unit.

In one embodiment, the surface plasmon resonance sensing chip is configured to receive a broadband light beam for generating a plasmon resonance light beam, and the apparatus further comprises a spectral modulation module comprising a first bandwidth filter and a second bandwidth filter. The spectral modulation module receives the plasmon resonance light beam to generate the first bandwidth plasmon resonance light beam and the second bandwidth plasmon resonance light beam. The surface plasmon resonance wavelength of the surface plasmon resonance sensing chip is less than a minimum cutoff wavelength of the first bandwidth filter and greater than a maximum cutoff wavelength of the second bandwidth filter. A difference between the surface plasmon resonance wavelength and the minimum cutoff wavelength of the first bandwidth filter is less than 10 nm, and a difference between the surface plasmon resonance wavelength and the maximum cutoff wavelength of the second bandwidth filter is less than 10 nm.

In one embodiment, the spectral modulation module further comprises a switch unit coupling to the first bandwidth filter and the second bandwidth filter for switching the first bandwidth filter and the second bandwidth filter in a light path between the surface plasmon resonance sensing chip and the imaging module.

In one embodiment, the spectral modulation module further comprises a light splitting module configured to receive the plasmon resonance light beam for generating a first split light beam and a second split light beam. The first bandwidth filter is configured to receive the first split light beam for generating the first bandwidth plasmon resonance light beam, and the second bandwidth filter is configured to receive the second split light beam for generating the second bandwidth plasmon resonance light beam.

In one embodiment, the light splitting module comprises a light splitter for generating the first split light beam and the second split light beam.

In one embodiment, the light splitting module comprises a light splitter and a reflector, and the reflector is located between the light splitter and the first bandwidth filter or between the light splitter and the second bandwidth filter.

In one embodiment, the imaging module comprises an imaging unit and a lens, the lens is located between the first bandwidth filter, the second bandwidth filter and the imaging unit, and the first bandwidth plasmon resonance light beam and the second bandwidth plasmon resonance light beam pass through the lens and are then projected on the imaging unit.

In one embodiment, the imaging module comprises a first imaging submodule and a second imaging submodule. The first imaging submodule comprises a first lens and a first imaging unit, the first lens is located between the first bandwidth filter and the first imaging unit, and the first bandwidth plasmon resonance light beam passes through the first lens and is then projected on the first imaging unit. The second imaging submodule comprises a second lens and a second imaging unit, the second lens is located between the second bandwidth filter and the second imaging unit, and the second bandwidth plasmon resonance light beam passes through the second lens and is then projected on the second imaging unit.

In one embodiment, the plasmon resonance light beam is a reflected light beam or a transmitted light beam.

The present disclosure also provides a method for surface plasmon resonance imaging, comprising steps of: receiving a first bandwidth plasmon resonance light beam and a second bandwidth plasmon resonance light beam from a surface plasmon resonance sensing chip by an imaging module for generating a first bandwidth surface plasmon image signal and a second bandwidth surface plasmon image signal, respectively; wherein the surface plasmon resonance sensing chip has a surface plasmon resonance wavelength, the surface plasmon resonance wavelength is less than a minimum wavelength of the first bandwidth plasmon resonance light beam and greater than a maximum wavelength of the second bandwidth plasmon resonance light beam, a difference between the surface plasmon resonance wavelength and the minimum wavelength of the first bandwidth plasmon resonance light beam is less than 10 nm, and a difference between the surface plasmon resonance wavelength and the maximum wavelength of the second bandwidth plasmon resonance light beam is less than 10 nm; and receiving the first bandwidth surface plasmon image signal and the second bandwidth surface plasmon image signal by an image processing unit for generating a surface plasmon signal image, wherein the image processing unit is coupled to the imaging module.

In one embodiment, the surface plasmon signal image is obtained by the image processing unit according to an equation of:

$$\text{the surface plasmon signal image} = \frac{\text{first bandwidth surface plasmon image signal} - \text{second bandwidth surface plasmon image signal}}{\text{first bandwidth surface plasmon image signal} + \text{second bandwidth surface plasmon image signal}}.$$

In one embodiment, a difference between the surface plasmon resonance wavelength and the minimum wavelength of the first bandwidth plasmon resonance light beam is less than 10 nm.

In one embodiment, a difference between the surface plasmon resonance wavelength and the maximum wavelength of the second bandwidth plasmon resonance light beam is less than 10 nm.

DETAILED DESCRIPTION OF THE DISCLOSURE

Figure 1:
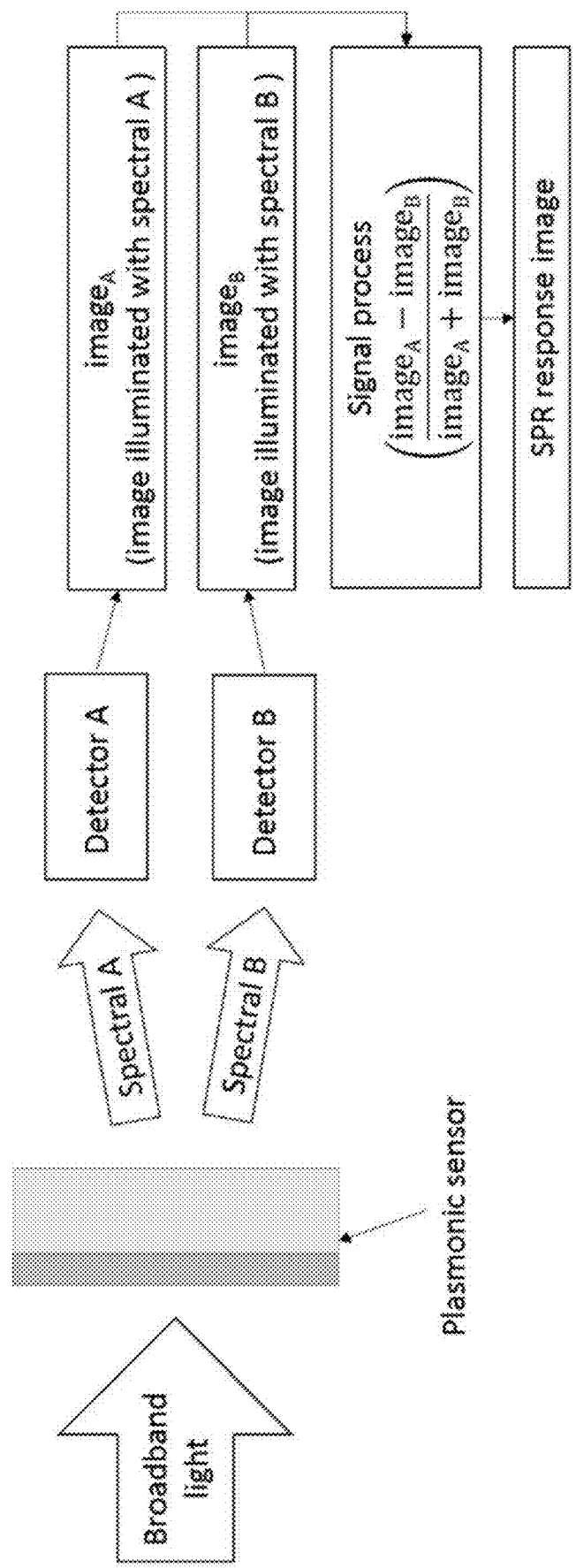
FIG. 1 is a schematic diagram showing the method for surface plasmon resonance imaging.
Figure 2:
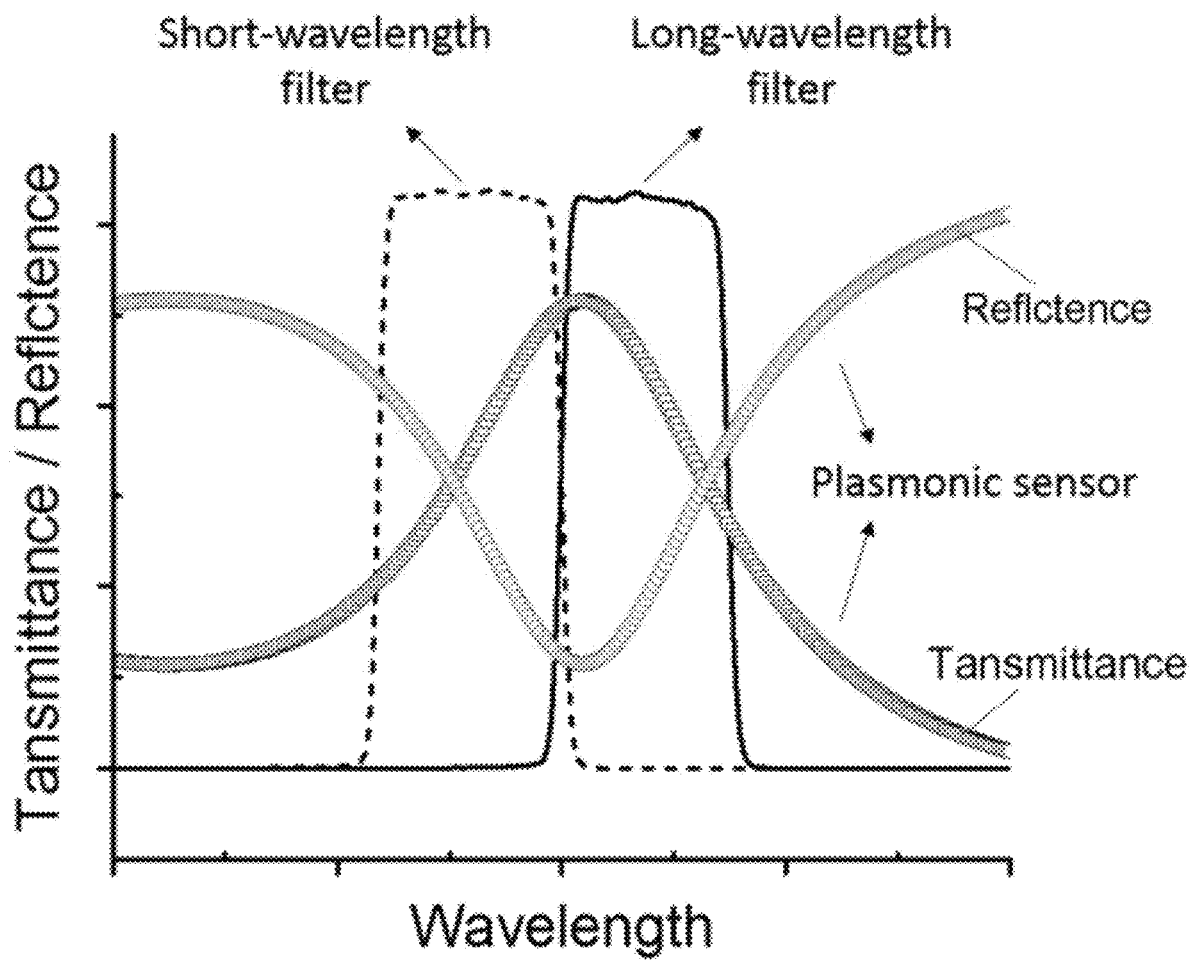
FIG. 2 is a schematic spectral graph showing the working theory of the method for surface plasmon resonance imaging, wherein the dotted line represents the transmittance spectrum of the short-wavelength filter, the solid line represents the transmittance spectrum of the long-wavelength filter, the line of circles represents the reflectance spectrum of the surface plasmon sensor, and the line of blocks represents the transmittance spectrum of the surface plasmon sensor.

This disclosure provides a new method and apparatus for surface plasmon imaging. FIG. 1 introduces the working theory of the method of this disclosure. On the metal surface with surface plasmon resonance, the transmitted or reflected spectrum thereof has a resonance peak or dip, and the center position of the peak or dip is $\lambda_{SPR}$ (see FIG. 2). The above-mentioned surface plasmon sensor is irradiated by a light beam, and the light beam can pass through two designed bandpass filters. The two filters can divide the transmitted peak of the surface plasmon sensor into a short-wavelength portion and a long-wavelength portion. In order to determine the two-dimensional surface plasmon signal, the light beam passing the long bandwidth filter is imaged to form a long bandwidth surface plasmon image (image $A_{ij}$), wherein i and j are the corresponding pixels in the x and y directions. In addition, the light beam passing the short bandwidth filter is imaged to form a short bandwidth surface plasmon image (image $B_{ij}$). The images can be calculated to provide the surface plasmon signal images. Through the custom equation of $(A_{ij}-B_{ij})/(A_{ij}+B_{ij})$, a self-reference image can be obtained, wherein $A_{ij}$ and $B_{ij}$ represent the light intensities of the image pixel ij. The custom equation is usually applied to double sensors or quaternary position sensors for sensing the position of light beam. If the light beam contains noises, the equation can be modified as:

$$\frac{[(A+dI)-(B+dI)]}{[(A+dI)+(B+dI)]} = \frac{A-B}{A+B+2dI} \approx \frac{A-B}{A+B}. \qquad (1)$$

Since A~B>>dI, the affection of the noise to the signal can be sufficiently decreased.

Figure 3:
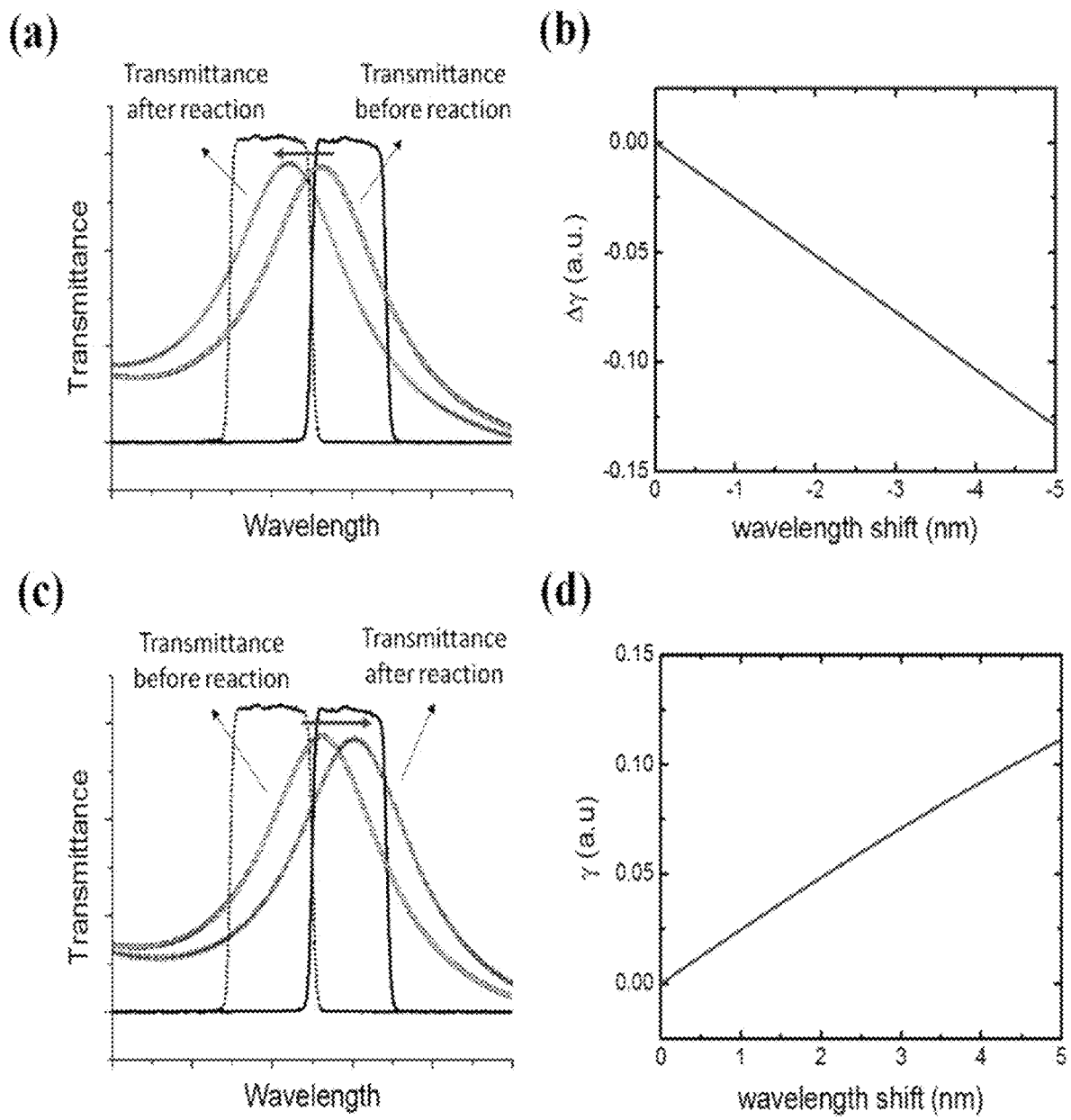
FIG. 3 is schematic graphs showing the theoretical verification of dynamic region, wherein (a) shows the transmittance blue shift of a surface plasmon resonance wavelength; (b) shows the relationship of the signal value and the wavelength shift of (a); (c) shows the transmittance red shift of a surface plasmon resonance wavelength; and (d) shows the relationship of the signal value and the wavelength shift of (c)

In this disclosure, the dynamic regions are evaluated by numerical method. FIGS. 3(a) to 3(d) indicate that the positions of transmitted peaks can be shifted as the change of refractive index during the sensing procedure. FIG. 3(a) shows the blue shift surface plasmon spectrum signal, which represents the molecular dissociation event detected by the surface plasmon sensor. The contrast signal is defined as $\gamma=(A-B)/(A+B)$. Compared with the wavelength shift, it is well known that the wavelength shift method can provide extremely wide dynamic region. FIGS. 3(b) and 3(d) show the relationship of the contrast signal and the wavelength shift. The examples of red shift and blue shift both have linear relationship within the wavelength shift range from −5 nm to +5 nm. The dynamic region corresponds to the refractive index range from −0.0106 to +0.0106. In other words, this method is suitable for the interaction of most biomolecules.

Figure 4A:
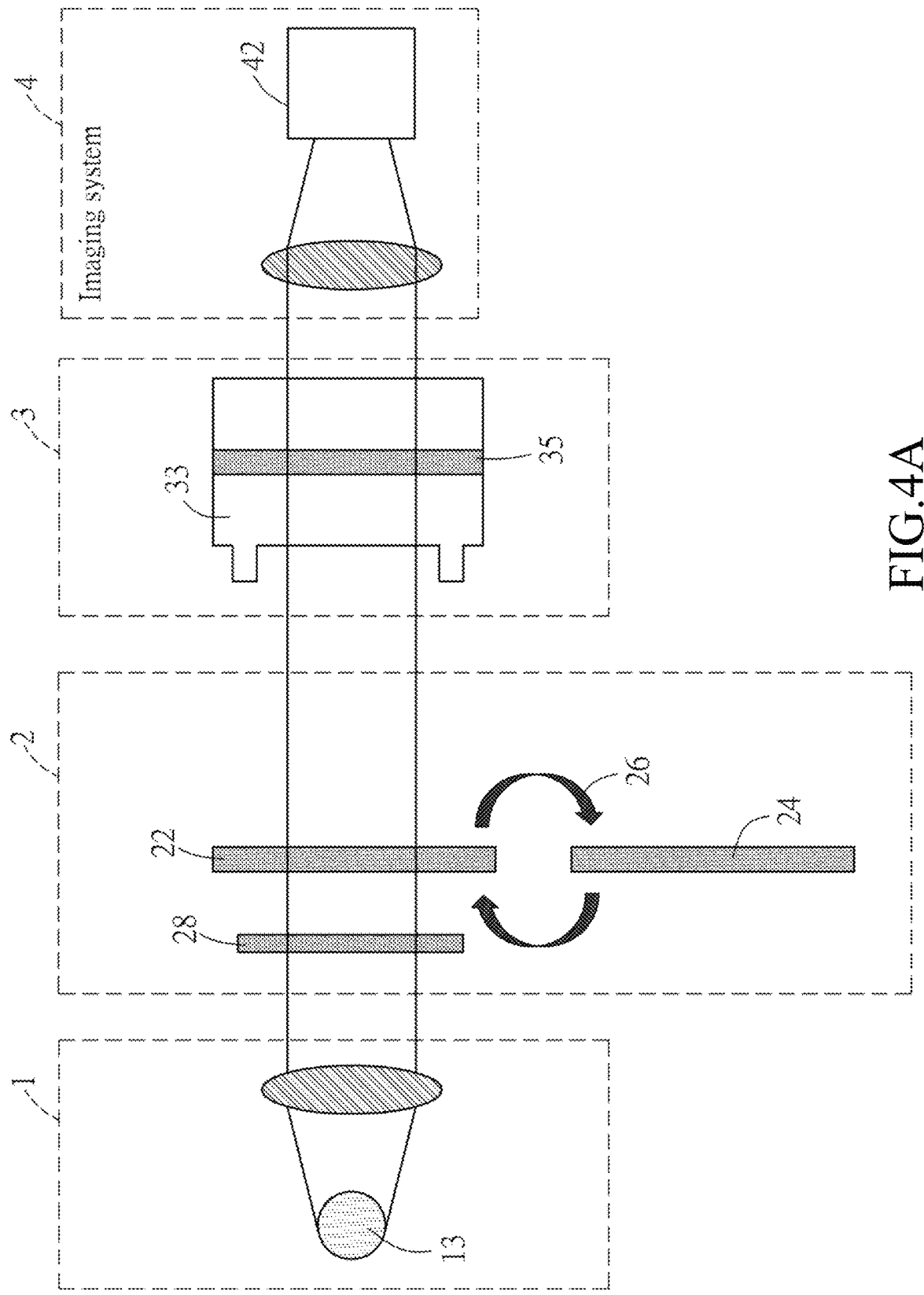
FIG. 4A is a schematic diagram showing an apparatus for surface plasmon imaging according to an embodiment of this disclosure.

Referring to FIG. 4A, to implement the above method, an optical setup includes an illumination system 1, two narrow-band filters 22 and 24, a sensing unit 3 (including a surface plasmon resonance sensing chip), and a monochrome imaging device 42. The sensing unit 3 is composed of a fluidic device 33 and a surface plasmon sensor 35. The surface plasmon sensor 35 can be an abnormal transmission-type surface plasmon sensor or a localized surface plasmon resonance sensor. In this embodiment, the surface plasmon sensor 35 is an abnormal transmission-type surface plasmon sensor for example. That is, although this embodiment utilizes the abnormal transmission-type surface plasmon sensor for measuring the transmitted light as an example, the objective can also be achieved by measuring the reflected light, the setup of which will be described later. The fluidic device 33 is used to inject a test sample onto the surface plasmon sensor 35. The abnormal transmission-type surface plasmon sensor 35 is composed of gold-capped nanowire arrays. The above-mentioned two narrow-band filters 22 and 24 all have a narrow bandwidth (<40 nm), wherein the long-band boundary of one of the narrow-band filters is close to the surface plasmon resonance wavelength of the surface plasmon sensor ($\lambda_{long\text{-}boundary} - \lambda_{SPR} \leq 3\sim5$ nm), and the short-band boundary of the other narrow-band filters is close to the surface plasmon resonance wavelength of the surface plasmon sensor ($\lambda_{SPR} - \lambda_{short\text{-}boundary} \leq 3\sim5$ nm). A drive device 26 is used to switch the positions of these filters. The illumination system 1 is a halogen bulb, a light emitting diode, or a white light source having a continuous bandwidth. The imaging module 4 described above is a monochrome imaging device 42. In the image captured by the imaging device 42, the image generated by the light beam passing through the long-band filter 22 is called a long-band surface plasmon image, and the image generated by the light beam passing through the short-band filter 24 is called a short-band surface plasmon image. The surface plasmon signal image can be obtained by the following equation of:

$$\text{the surface plasmon signal image} = \frac{\text{long band surface plasmon image signal} - \text{short band surface plasmon image signal}}{\text{long band surface plasmon image signal} + \text{short band surface plasmon image signal}}.$$

Figure 4B:
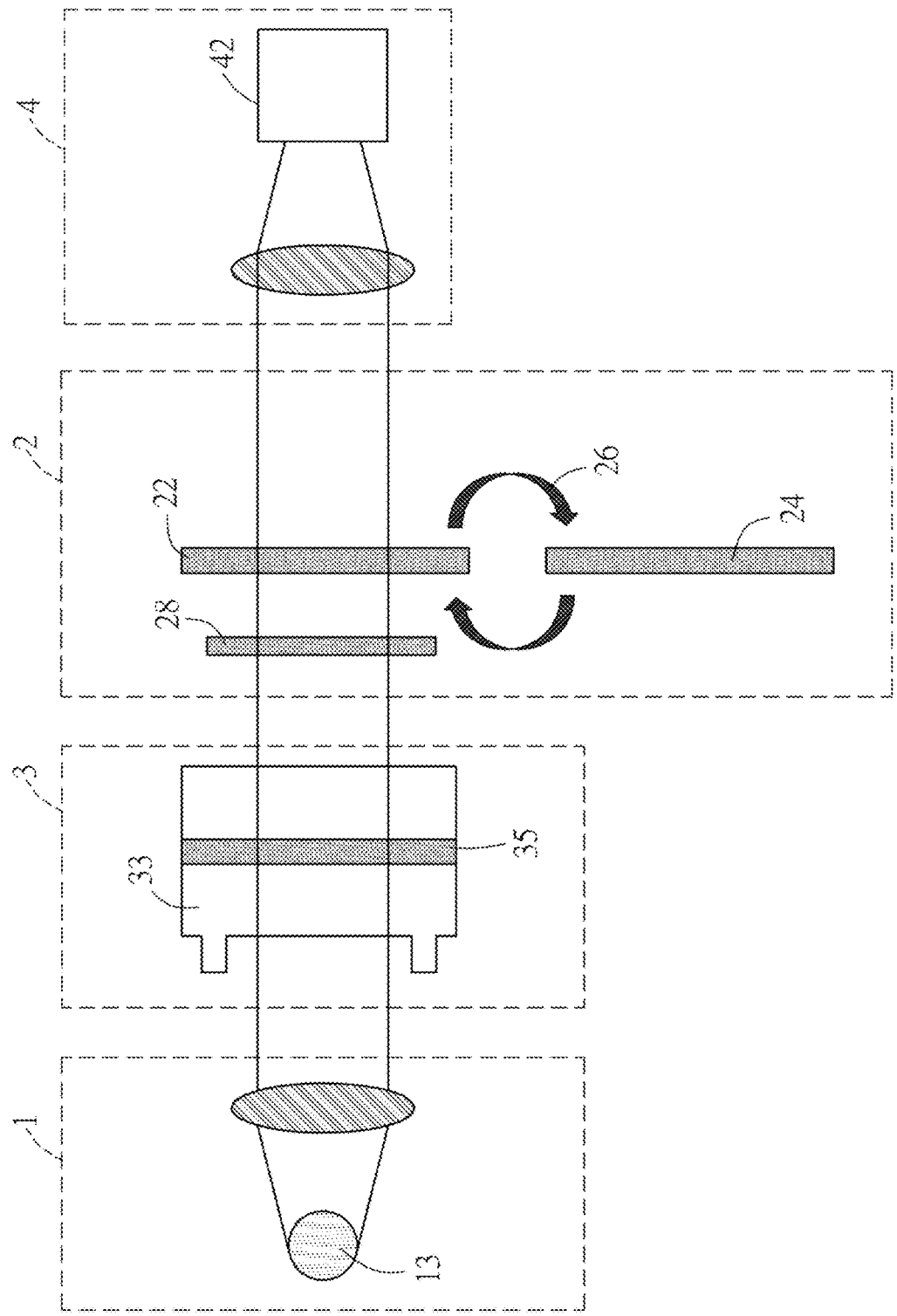
FIG. 4B is a schematic diagram showing an apparatus for surface plasmon imaging according to another embodiment of this disclosure.

FIG. 4B shows a modification of the structure of FIG. 4A, and the modification is mostly the same as the structure of FIG. 4A. Different from the structure of FIG. 4A, the spectral modulation module 2 of FIG. 4B, which comprises a linear polarizer 28, a long-band filter 22 and a short-band filter 24, is disposed between the surface plasmon sensor 35 and the imaging device 42 (camera).

Figure 5A:
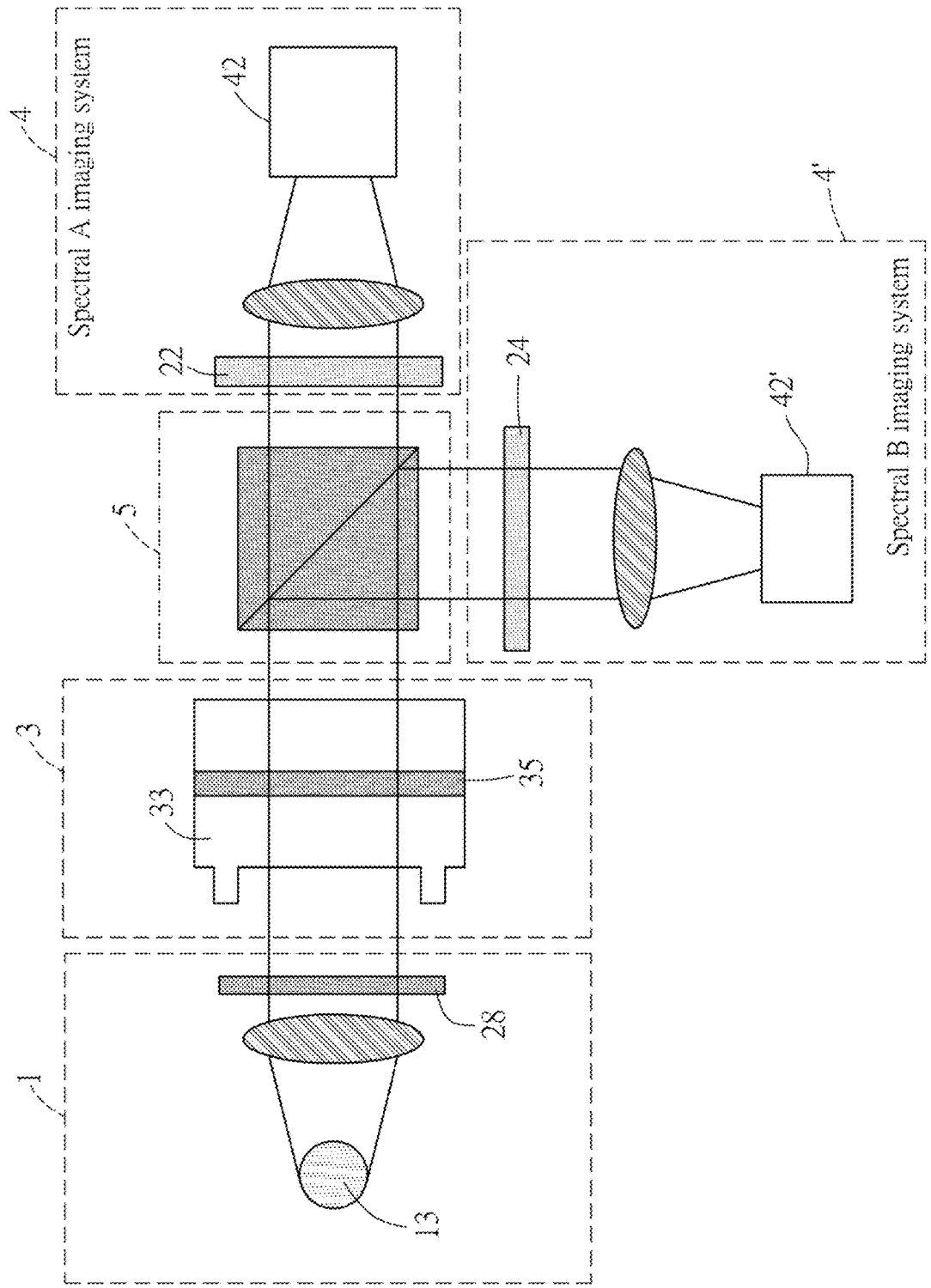
FIG. 5A is a schematic diagram showing an apparatus for surface plasmon imaging, which comprises an abnormal transmission-type surface plasmon sensor and two cameras, according to an embodiment of this disclosure.

FIG. 5A shows another substitute structure of this disclosure, which is mostly the same as the structure of FIG. 4A. Different from the structure of FIG. 4A, in the optical setup of FIG. 5A, the long-band surface plasmon image and the short-band surface plasmon image are captured by two monochrome imaging devices 42 and 42' (cameras), respectively. To implement this method, a 50/50 light splitter (21000, Chroma) is provided to split the light beam, and two bandpass filters 22 and 24 (ET640/20m and ZET660/20x, Chroma) are disposed in front of the two imaging devices 42 and 42' (cameras), respectively. According to this structure, the long-band surface plasmon image and the short-band surface plasmon image can be captured simultaneously, so the additional time for switching the two bandpass filters is unnecessary, thereby improving the temporal resolution.

Figure 5B:
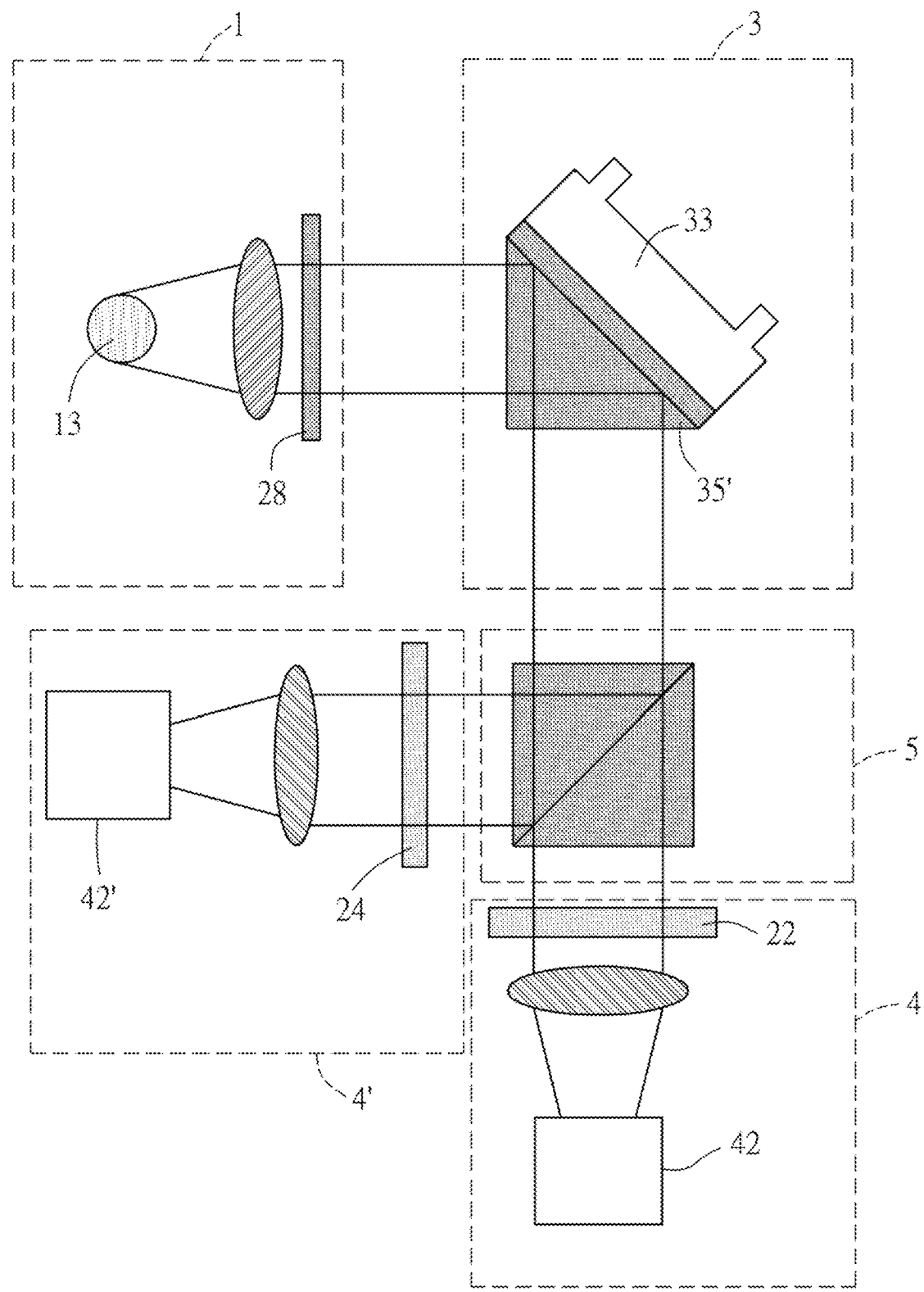
FIG. 5B is a schematic diagram showing an apparatus for surface plasmon imaging, which comprises a prism-type surface plasmon sensor and two cameras, according to an embodiment of this disclosure.

FIG. 5B shows a modification of the structure of FIG. 5A, and the modification is mostly the same as the structure of FIG. 5A. Different from the structure of FIG. 5A, in the structure of FIG. 5B, the prism-type surface plasmon sensor 35' is used for replacing the abnormal transmission-type surface plasmon sensor 35 of FIG. 5A.

Figure 6A:
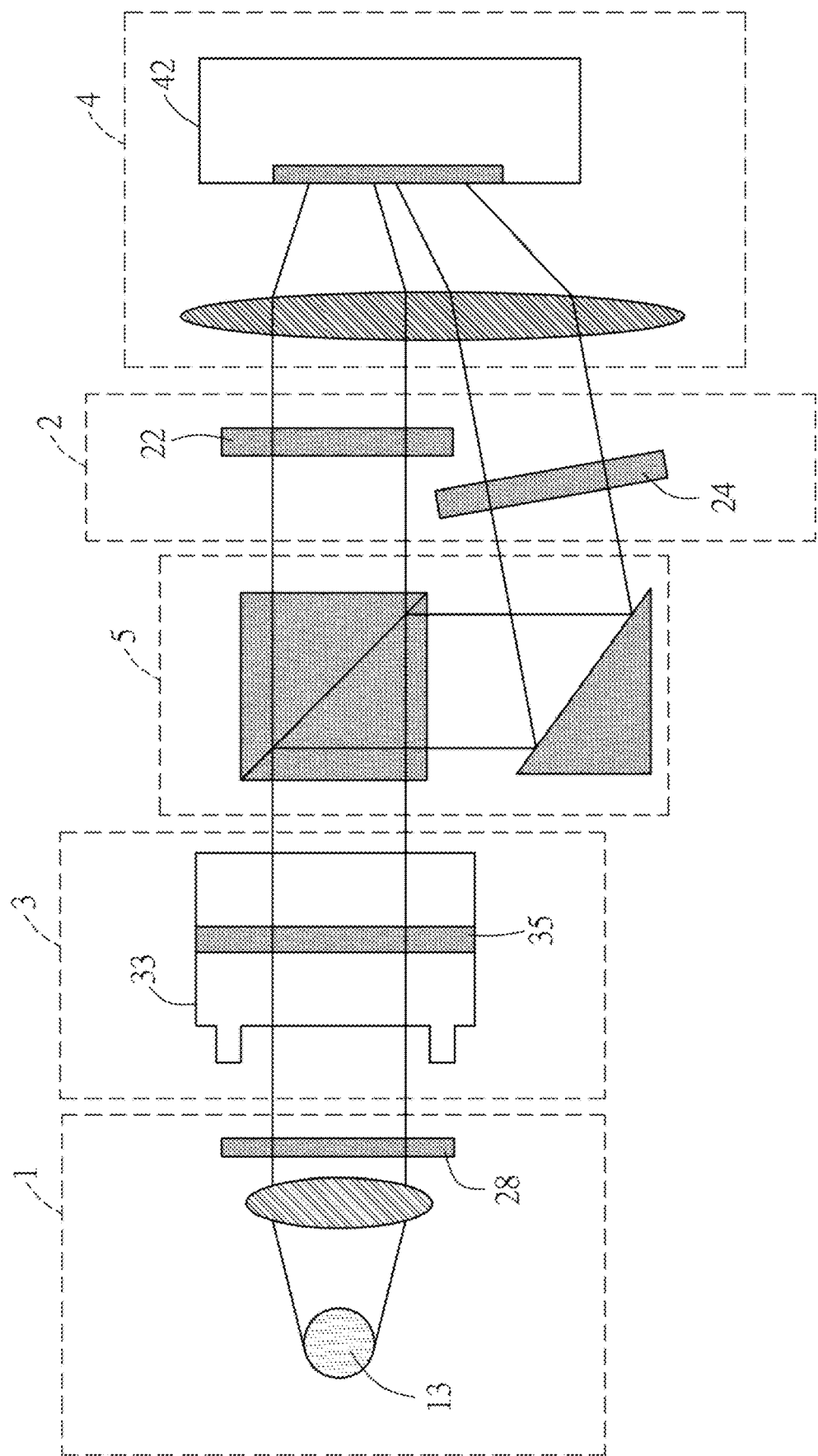
FIG. 6A is a schematic diagram showing an apparatus for surface plasmon imaging, which comprises an abnormal transmission-type surface plasmon sensor and one camera, according to an embodiment of this disclosure.

FIG. 6A shows another substitute structure of this disclosure, which is mostly the same as the structure of FIG. 5A. Different from the structure of FIG. 5A, in the embodiment of FIG. 6A, the long-band surface plasmon image and the short-band surface plasmon image are captured by one monochrome imaging device 42 (camera), respectively. To implement this method, a built-in 50/50 light splitter (21000, Chroma) is provided to split the light beam, and an image dividing device 5 containing two bandpass filters 22 and 24 (ET640/20m and ZET660/20x, Chroma) is provided to divide the image. Then, the imaging device 42 (camera) can form the images. According to this structure, the long-band surface plasmon image and the short-band surface plasmon image can be captured simultaneously by the same camera in different pixel regions, so the additional time for switching the two bandpass filters 22 and 24 is unnecessary, thereby improving the temporal resolution.

Figure 6B:
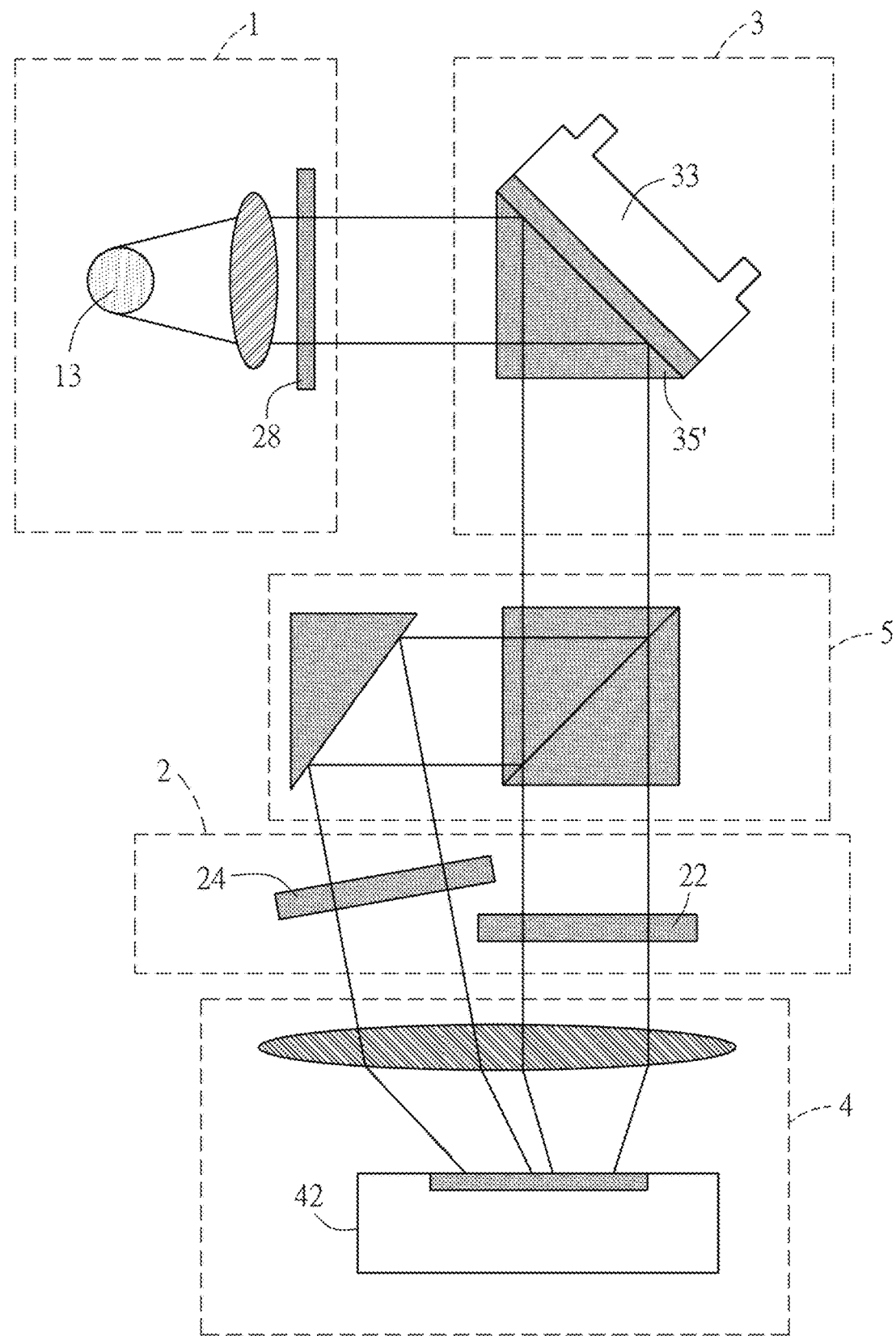
FIG. 6B is a schematic diagram showing an apparatus for surface plasmon imaging, which comprises a prism-type surface plasmon sensor and one camera, according to an embodiment of this disclosure.

FIG. 6B shows a modification of the structure of FIG. 6A, and the modification is mostly the same as the structure of FIG. 6A. Different from the structure of FIG. 6A, in the structure of FIG. 6B, the prism-type surface plasmon sensor 35' is used for replacing the abnormal transmission-type surface plasmon sensor 35 of FIG. 6A.

Figure 7A:
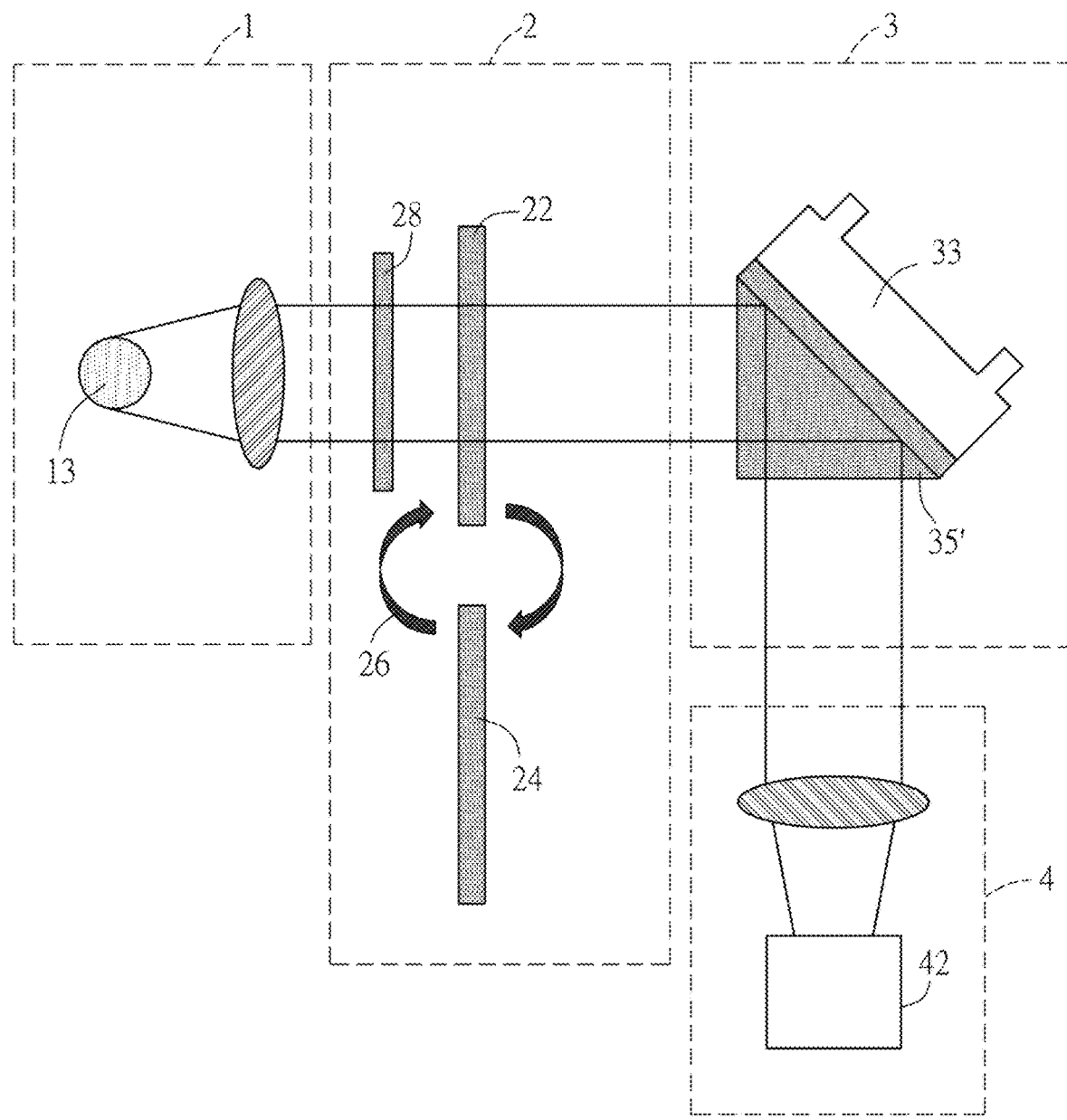
FIG. 7A is a schematic diagram showing an apparatus for surface plasmon imaging, which comprises a prism-type surface plasmon sensor, according to an embodiment of this disclosure.

FIG. 7A is a schematic diagram showing an apparatus for surface plasmon imaging, which comprises a prism-type surface plasmon sensor 35', according to an embodiment of this disclosure. In this embodiment, the light beam is emitted from the light source to the prism-type surface plasmon sensor 35' and is then reflected to the imaging device 42 (camera). The spectral modulation module 2, which comprises a linear polarizer 28, a long-band filter 22 and a short-band filter 24, is disposed between the broadband light source 13 and the prism-type surface plasmon sensor 35'. The drive device 26 of the spectral modulation module 2 is configured to make the light beam to pass through the long-band filter 22 for capturing the long-band surface plasmon image. Afterwards, the drive device 26 further makes the light beam to pass through the short-band filter 24 for capturing the short-band surface plasmon image. Finally, the surface plasmon signal image can be calculated.

Figure 7B:
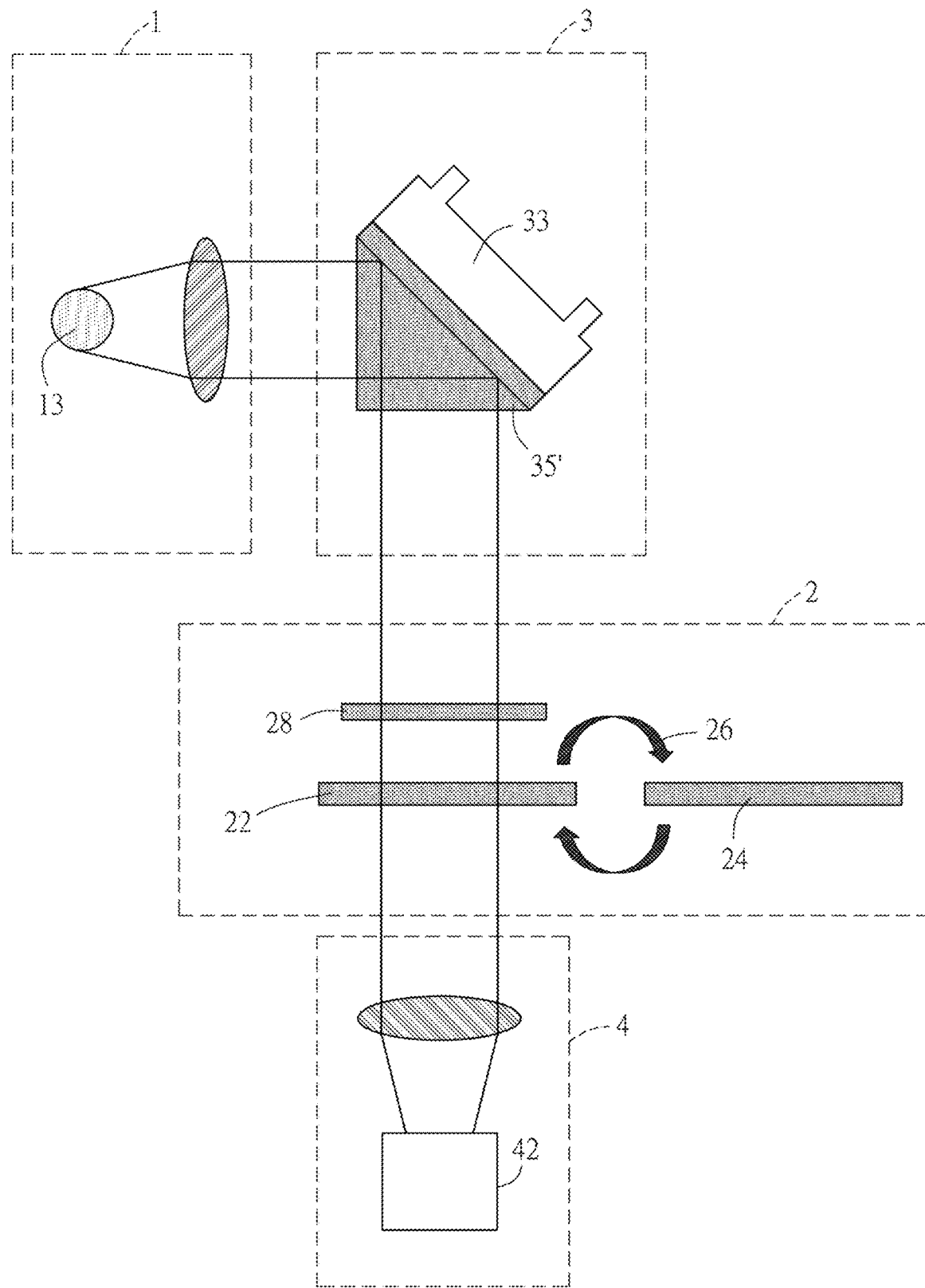
FIG. 7B is a schematic diagram showing an apparatus for surface plasmon imaging, which comprises a prism-type surface plasmon sensor, according to another embodiment of this disclosure.

To be noted, the position of the spectral modulation module 2, which comprises the linear polarizer 28, the long-band filter 22 and the short-band filter 24, is not limited to that shown in FIG. 7A. For example, the spectral modulation module 2 can be disposed between the surface plasmon sensor 35 and the imaging device 42 (camera). FIG. 7B shows a modification of the structure of FIG. 7A, and the modification is mostly the same as the structure of FIG. 7A. Different from the structure of FIG. 7A, the spectral modulation module 2, which comprises the linear polarizer 28, the long-band filter 22 and the short-band filter 24, is disposed between the prism-type surface plasmon sensor 35' and the imaging device 42 (camera).

Figure 13A:
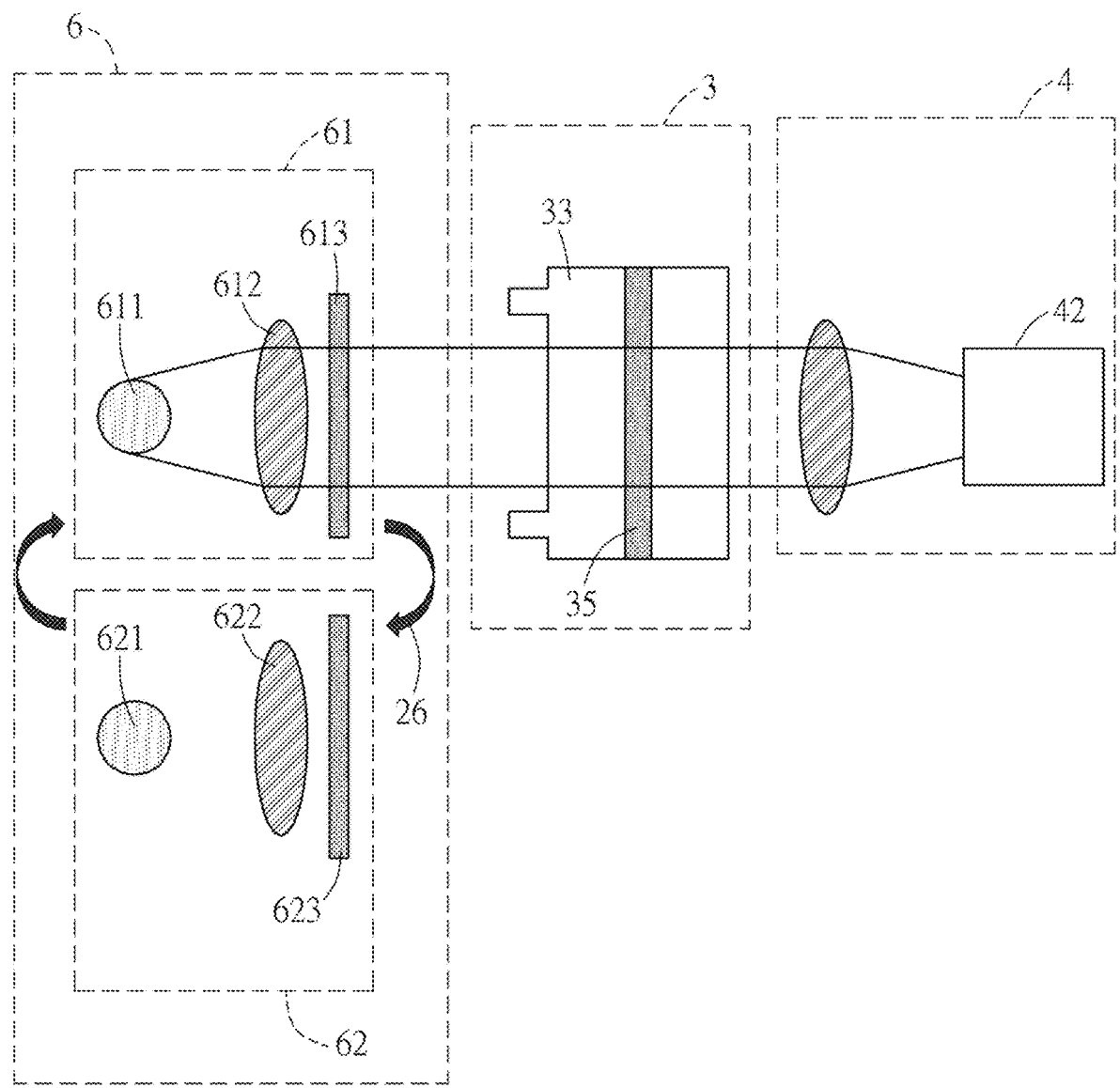
FIG. 13A is a schematic diagram showing an apparatus for surface plasmon imaging utilizing two light sources and the prism-type surface plasmon sensor according to an embodiment of this disclosure.

In addition, this disclosure also provides an apparatus for surface plasmon imaging. Referring to FIG. 13A, the apparatus comprises a light source module 6, a sensing unit 3 (including a surface plasmon resonance sensing chip), an imaging device 4, and an image processing unit. The structure of the apparatus is mostly the same as the structure of FIG. 4A. Different from the structure of FIG. 4A, the embodiment of FIG. 13A comprises a light source module 6 for emitting incident light beams of two different bandwidths to substitute the broadband light source and spectral modulation module 2 of FIG. 4A. As shown in FIG. 13A, the light source module 6 comprises a first bandwidth light-emitting submodule 61 and a second bandwidth light-emitting submodule 62. The first bandwidth light-emitting submodule 61 comprises a first bandwidth light-emitting unit 611, a first lens 612 and a first linear polarizer 613. The first bandwidth light-emitting unit 611 emits a first bandwidth incident light beam, which is emitted to the surface plasmon sensor (the surface plasmon resonance sensing chip) 35 through the first lens 612 and the first linear polarizer 613 in order. Similarly, the second bandwidth light-emitting submodule 62 comprises a second bandwidth light-emitting unit 621, a second lens 622 and a second linear polarizer 623. The second bandwidth light-emitting unit 621 emits a second bandwidth incident light beam, which is emitted to the surface plasmon resonance sensing chip 35 through the second lens 622 and the second linear polarizer 623 in order. In this embodiment, the surface plasmon sensor 35 is an abnormal transmission-type surface plasmon sensor for example. That is, although this embodiment utilizes the abnormal transmission-type surface plasmon sensor for measuring the transmitted light as an example, the objective can also be achieved by measuring the reflected light, the setup of which will be described later. The fluidic device 33 is used to inject a test sample onto the surface plasmon sensor 35. The abnormal transmission-type surface plasmon sensor 35 is composed of gold-capped nanowire arrays. The above-mentioned two incident light beams (the first bandwidth incident light beam and the second bandwidth incident light beam) both have a narrow bandwidth (<40 nm), wherein the long-band boundary of the second bandwidth incident light beam is close to the resonance wavelength of the surface plasmon sensor ($\lambda_{long\text{-}boundary} - \lambda_{SPR}$ 3~5 nm), and the short-band boundary of the first bandwidth incident light beam is close to the surface plasmon resonance wavelength of the surface plasmon sensor ($\lambda_{SPR} - \lambda_{short\text{-}boundary} \leq 3~5$ nm). A drive device 26 is used to switch the positions of the first bandwidth light-emitting submodule 61 and the second bandwidth light-emitting submodule 62. The imaging system described above is a monochrome imaging device 42. In the image captured by the imaging device 42, the image generated by the long-band light beam (the first bandwidth incident light beam) is called a long-band surface plasmon image, and the image generated by the short-band light beam (the second bandwidth incident light beam) is called a short-band surface plasmon image. The surface plasmon signal image can be obtained by the following equation of:

$$\text{the surface plasmon signal image} = \frac{\text{first band surface plasmon image signal} - \text{second band surface plasmon image signal}}{\text{first band surface plasmon image signal} + \text{second band surface plasmon image signal}}.$$

Figure 13B:
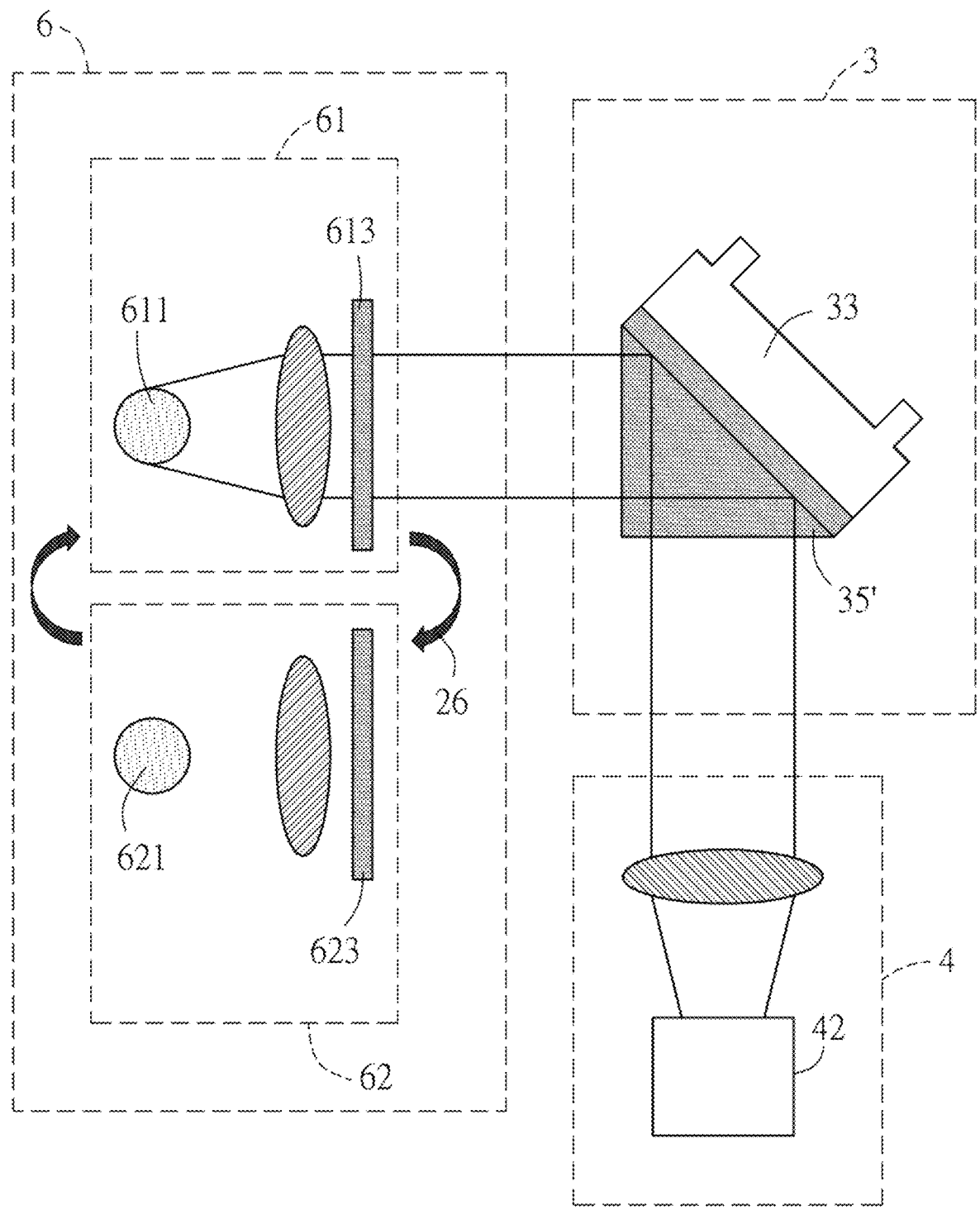
FIG. 13B is a schematic diagram showing an apparatus for surface plasmon imaging utilizing two light sources and the abnormal transmission-type surface plasmon sensor according to an embodiment of this disclosure.

FIG. 13B shows a modification of the structure of FIG. 13A, and the modification is mostly the same as the structure of FIG. 13A. Different from the structure of FIG. 13A, in the structure of FIG. 13B, the prism-type surface plasmon sensor 35' is used for replacing the abnormal transmission-type surface plasmon sensor 35 of FIG. 13A.

Figure 8:
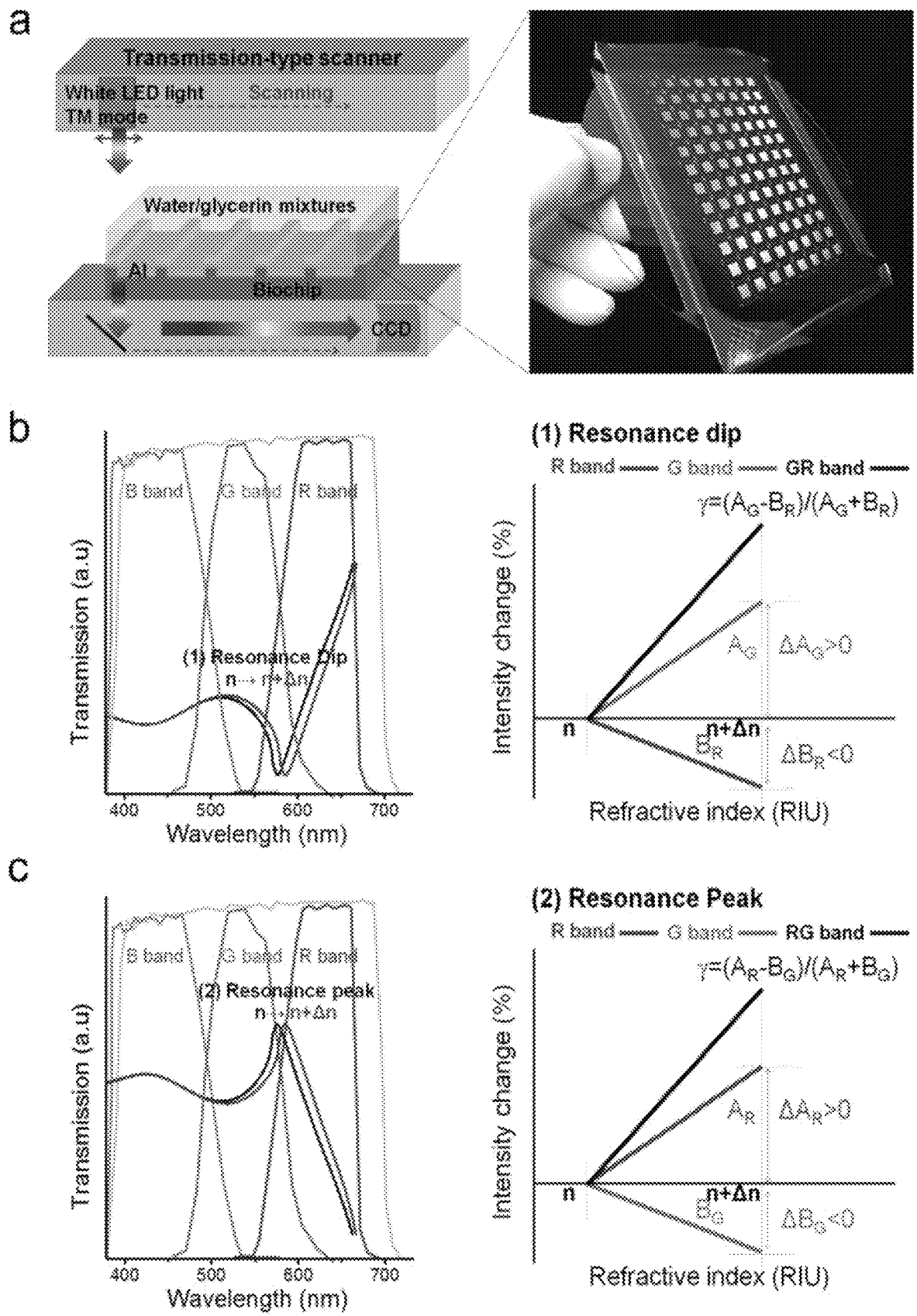
In FIG. 8, (a) shows a scanning device according to an embodiment of this disclosure and an image of a nanostructure plasmon sub-biochip; and (b) and (c) show red, green and blue segment analysis method applied to a transmission-type plasmon sub-chip with narrow resonance peak and narrow resonance dip.

In FIG. 8, (a) shows a scanning device according to an embodiment of this disclosure and an image of a nanostructure plasmon sub-biochip; and (b) and (c) show red, green and blue segment analysis method applied to a transmission-type plasmon sub-chip with narrow resonance peak and narrow resonance dip. The white light LED lamp of the transmission-type scanner can be divided into red, green and blue segments, and the resonance peak or dip of the metal nanostructure can be adjusted to be presented on the overlapping region of red and green segments or blue and green segments. Regarding the resonance peak, when the peak increases according to the environmental refractive index so as to generate the red shift, the shift can cause the increase of the transmitted light intensity of red segment ($A_R$) and the decrease of the transmitted light intensity of green segment ($B_G$). On the contrary, regarding the resonance dip, the shift of dip can cause the decrease of the transmitted light intensity of red segment and the increase of the transmitted light intensity of green segment. The custom equation of the red and green segments at the resonance peak and resonance dip can be represented as follow: $\gamma = (A_G - B_R)/(A_G + B_R)$ and $\gamma = (A_R - B_G)/(A_R + B_G)$. This equation can remove the common noise and increase the sensing ability. In FIG. 8, (a) indicates that the metal nanostructure can be metal-capped nanowire multi-array structure.

Example I

Figure 9:
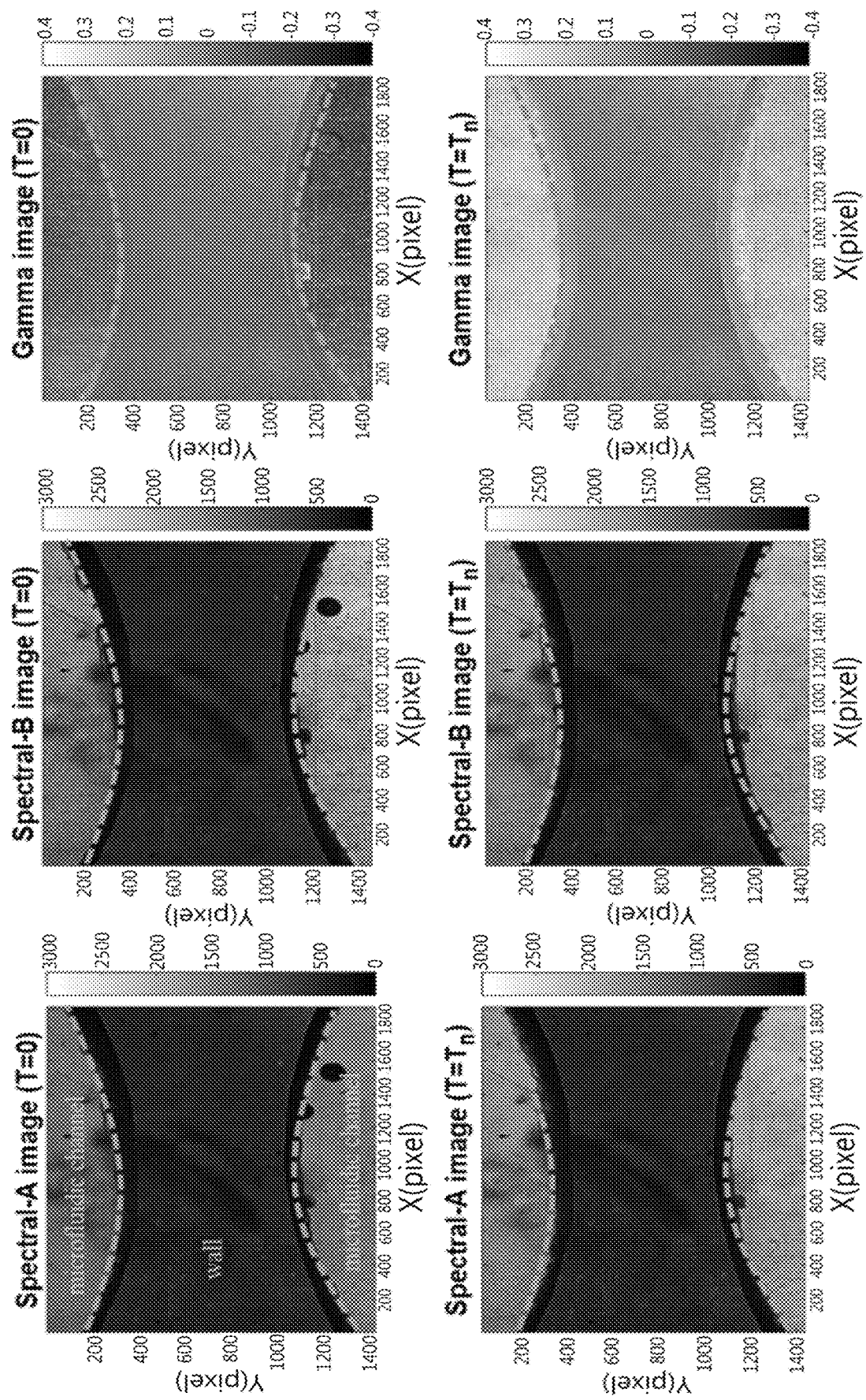
FIG. 9 shows surface plasmon signal images (the upper images are before adding high refraction solution, and the lower images are after adding high refraction solution), wherein spectral-A images represent the long-bandwidth surface plasmon images, spectral-B images represent the long-bandwidth surface plasmon images, Gamma images represent the long-bandwidth surface plasmon signal images.

The apparatus of FIGS. 4A and 4B is used in this example, wherein the images of different spectra can be captured by the same camera, and the surface plasmon signal image can also be calculated. In this structure, a stable intensity halogen lamp is used to generate a broadband light source, and two bandpass filters (ET640/20m and ZET660/20x, Chroma) are mounted on a motorized filter wheel for light switching. The metal-capped nanowire array structure is used as the surface plasmon sensor, wherein the period of the nanowire array is designed to be 470 nm so that the surface plasmon resonance wavelength in water is 650 nm. This surface plasmon sensor is placed on the microscope's observation platform for imaging. A complementary monochromatic metal oxide semiconductor camera (C11440, Hamamatsu) is used to capture images of the surface plasmon sensor. The upper/lower rows of images of FIG. 9 represent the transmitted images of the surface plasmon sensors before and after the injection of the high refractive index solution. Comparing the intensities of the long-band surface plasmon images and the short-band surface plasmon images before and after the injection of the high refractive index solution, it is found that there is no obvious change, but the surface plasmon signal images clearly show a clear signal in the flow channel region.

Example II

Figure 10:
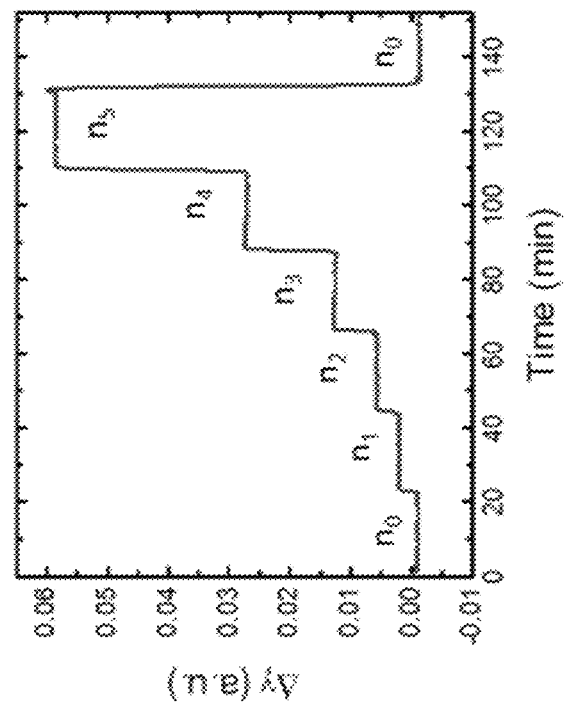
FIG. 10 shows the comparisons of the detection limits of the method and apparatus of this disclosure and the standard wavelength shift analysis method, wherein the up-left graph shows the sensing curve of glucose/water with different refractive indexes by utilizing the standard wavelength shift analysis method; the up-right graph shows the sensing curve of glucose/water with different refractive indexes by utilizing the method and apparatus of this disclosure (wherein, $n_0=1.3290$, $n_1=1.3295$, $n_2=1.3300$, $n_3=1.3305$, $n_4=1.3320$, $n_5=1.3355$ (refractive index unit, RIU)); the dots in the down-left graph are the surface plasmon signal variations measured by the standard wavelength shift analysis method, and the line is the linear regression analysis; the dots in the down-right graph are the surface plasmon signal variations measured by the method and apparatus of this disclosure, and the line is the linear regression analysis.
Figure 10:
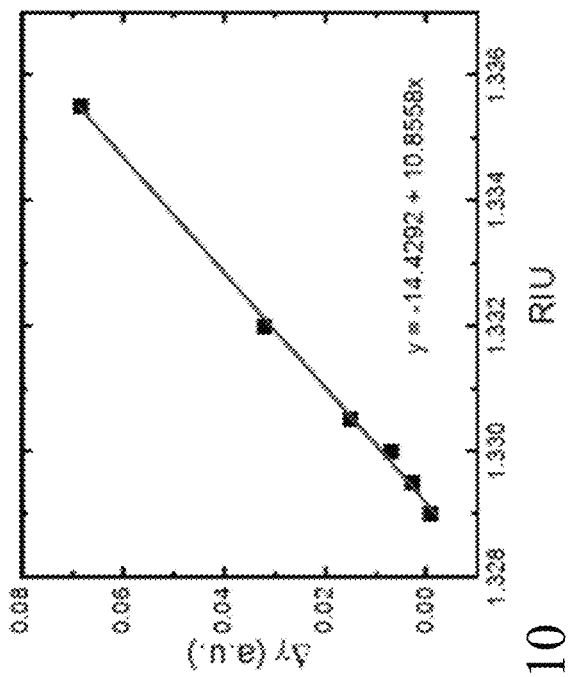
Figure 10:
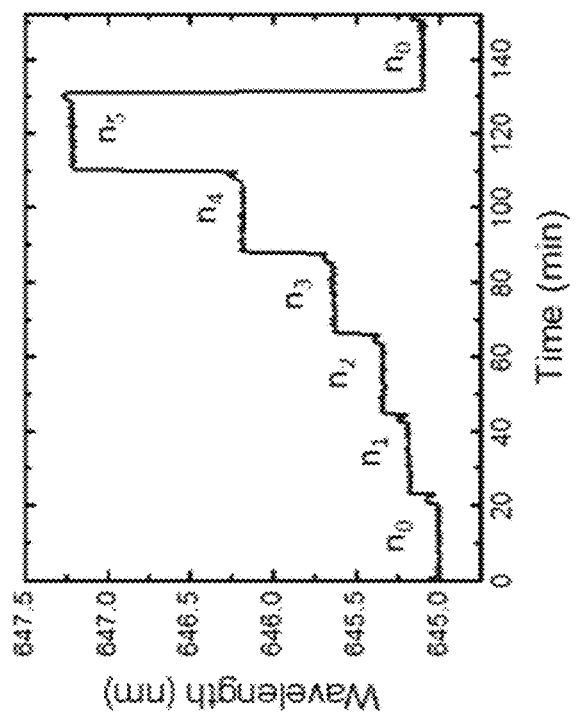
Figure 10:
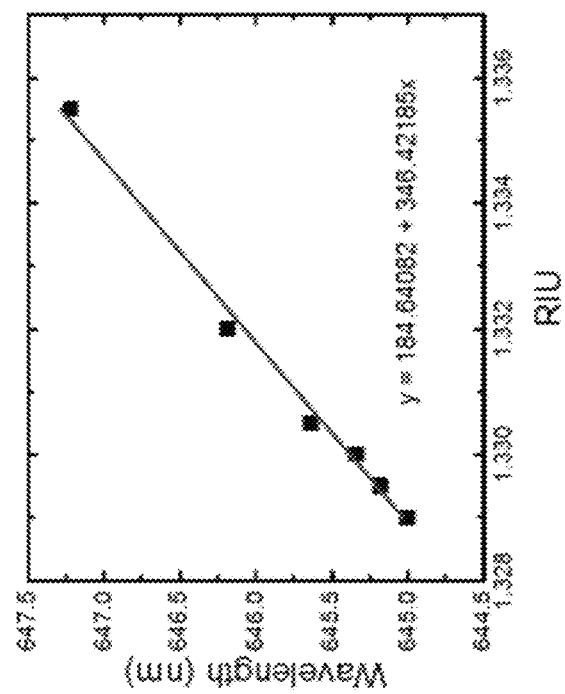

The detection limit is an important indicator of the surface plasmon sensor. In this embodiment, the detection limit of this disclosure will be tested by using the apparatus of FIGS. 4A and 4B and compared with the standard wavelength shift analysis method. In the test using the apparatus and method of the present disclosure, a structure composed of gold-capped nanowire arrays is used as a surface plasmon sensor, and a period of the nanowire array structure in the surface plasmon sensor is designed as 470 nm. This surface plasmon sensor is placed on the microscope's observation platform for imaging, and a complementary monochrome metal oxide semiconductor (CMOS) camera (C11440, Hamamatsu) is used to capture the image of the surface plasmon sensor. The glucose/water with different proportions and known refractive indexes is sequentially feed by using the micro-fluidic device, and the variation and stability of the sensing curves are analyzed so as to obtain the sensitivity and sensing limit. The standard wavelength shift analysis method uses a single-point measurement method to illuminate the same surface plasmon sensor with a focused spot, and the period of the nanowire array structure is designed to be 470 nm. The micro-fluidic device sequentially injects the glucose/water with different proportions and known refractive indexes (the same as that used in the above test utilizing the apparatus and method of this disclosure). The transmitted light is collected by the optical fiber, and transmitted to the spectrometer for obtaining the spectrum signal, thereby analyzing the sensitivity and detection limit by observing the wavelength shifts of the spectral peak. The sensitivity is defined as the amount of change of the surface plasmon signal caused by the change of refractive index per unit, and the detection limit is defined as the minimum amount of refractive index change that can be resolved by the system. The up-left graph of FIG. 10 shows the sensing curve measured by the standard wavelength shift analysis device and method. The up-right graph of FIG. 10 shows the sensing curve measured by the apparatus and method of the present disclosure. The two graphs can clearly indicate that when the refractive index of the test sample increases from $n_0=1.3290$ to $n_5=1.3355$, the wavelength and surface plasmon change signal also increase, and when the refractive index returns from $n_5=1.3355$ to $n_0=1.3290$, the wavelength and surface plasmon change signal also return to the baseline. Comparing the two signals, it can be seen that this disclosure can not only form the surface plasmon resonance image, but also reduce the influence of noise because of the self-reference signal. Compared to the commonly used resonance peak changes, this disclosure has better performance in signal to noise ratio. Further, the linear regression method is used to analyze the sensing curve as shown in the down-left figure of FIG. 10, and the relationship between the peak wavelength and the refractive index is $\lambda=184.64082+346.42185\times RIU$ (RIU: refractive index unit). Wherein, 346.42185 is the detection sensitivity of the standard wavelength shift analysis method, and the system stability can be obtained by continuously analyzing the peak wavelength signal of the glucose/water with the same refractive index. In this embodiment, the standard deviation of the peak wavelength signal obtained by analyzing the no measurement region is 0.0058 nm. Therefore, the detection limit of the method can be found to be $1.6743\times10^{-5}$ RIU. On the other hand, the relationship between the change of the surface plasmon signal and the refractive index is $\gamma=-14.4292+10.8558\times RIU$, wherein 10.85558 is the detection sensitivity of this disclosure. In this embodiment, the standard deviation of the surface plasmon signal obtained by analyzing the no measurement region is $1.12774\times10^{-4}$. Therefore, the detection limit of the method can be found to be $1.0394\times10^{-5}$ RIU. This value fully shows that this disclosure can achieve lower detection limit than the standard wavelength shift analysis method by the influence of self-reference signal noise. More importantly, the standard wavelength shift analysis method is only suitable for single point measurement, but the method and apparatus proposed in the present disclosure are suitable for full-field imaging, and can analyze multi-point signals at the same time, which has obvious benefits in measuring throughput.

Example III

Figure 11:
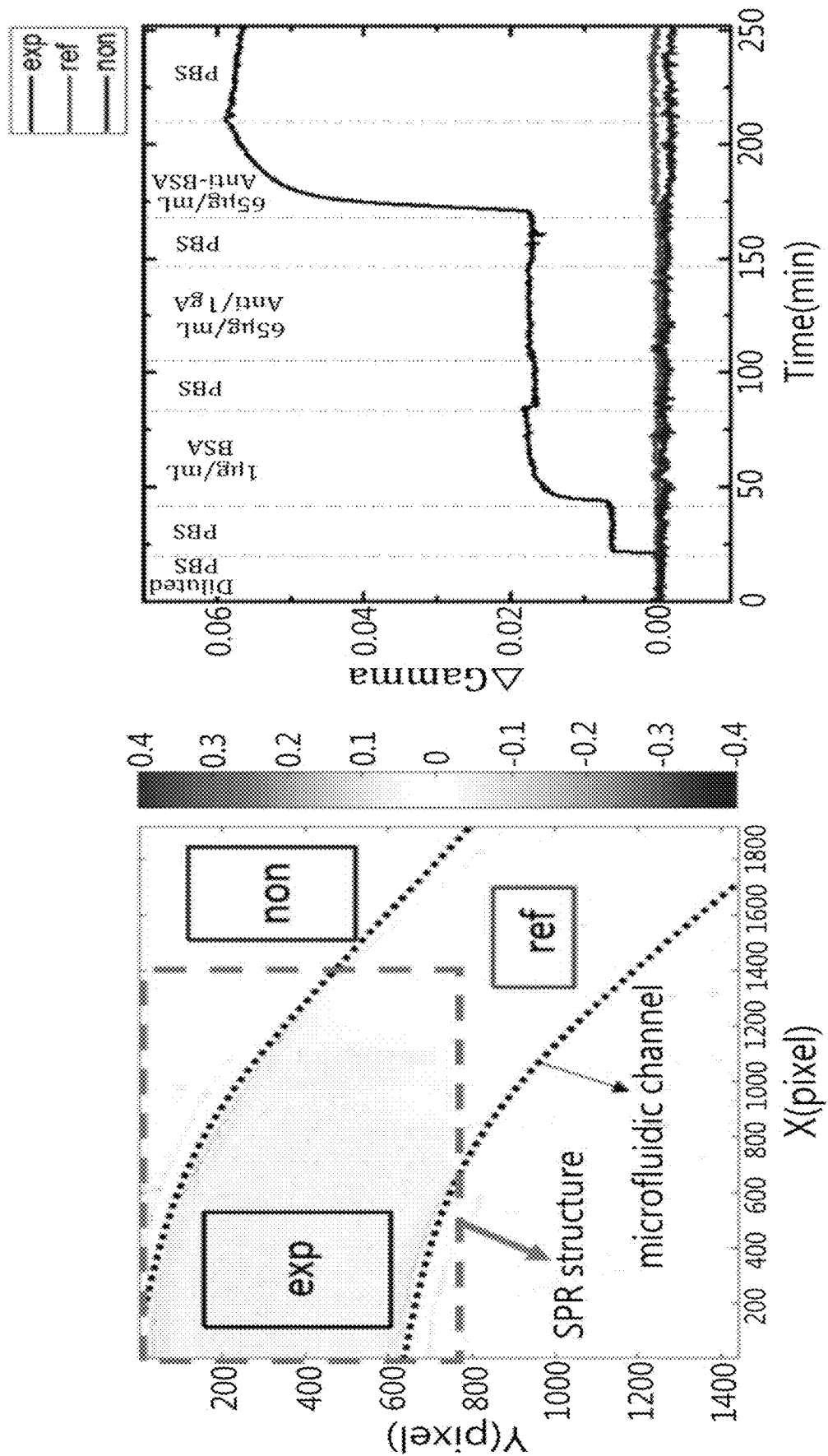
FIG. 11 shows the results of the reaction of protein and antigen measured by the real-time surface plasmon signal imaging technology of this disclosure, wherein the left graph shows the surface plasmon signal image measured at the end of the experiment, and the right graph shows the sensing curves obtained from the exp, ref and non regions.

The change of surface plasmon signal over time is called the sensing curve, which is an important application in the field of surface plasmon detection. The sensing curve can provide quite a lot of information, such as the affinity, the dissociation and binding rate of the labeled and test samples, the concentration of the target molecule, and the specificity of the interactive molecules. FIG. 11 illustrates an embodiment of a high throughput measurement sensing curve based on this disclosure. In this embodiment, the long-band surface plasmon image and the short-band surface plasmon image are sequentially recorded, and the time-series surface plasmon signal image is also calculated. Since all surface plasmon signal images are recorded at all times, the user can extract the sensing map in a particular area. The right graph of FIG. 11 includes three sensing curves labeled by exp, ref and non, which correspond to the surface plasmon signals extracted from the regions exp, ref, and non of the left graph, respectively. The region exp is located in the flow channel and is on the metal-capped nanowire array structure, so the surface plasmon signal can be obtained. Conversely, the region ref is not located on the nanowire array structure and the region non is outside the flow channel, so there is no surface plasma signal change.

Example IV

Figure 12:
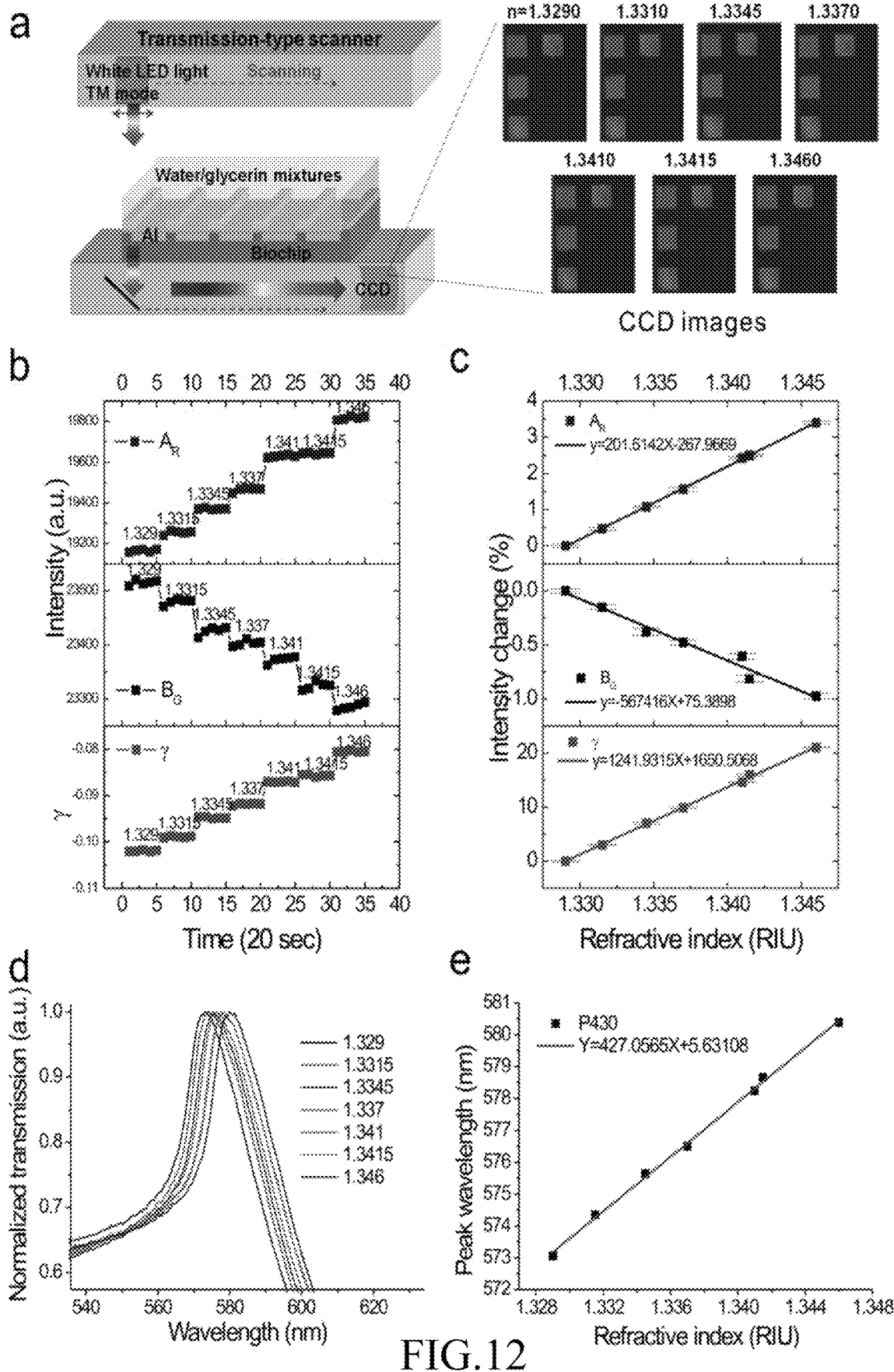
In FIG. 12, (a) commercial transmission-type scanner and double-layer aluminum nano-slit chip (left side) for detection experiments with different proportions of glycerin/water, and the right side shows the transmission images of the plasmon sub-chips scanned by the scanner in different proportions of glycerin/water, wherein the refractive index of glycerin water is between 1.3290 and 1.346; (b) the relationship of the environmental refractive index and the transmission intensity of the structures under the custom equations in red, green, and red and green; (c) the relationship of the environmental refractive index and the transmission intensity change of the structures under the custom equations in red, green, and red and green; (d) transmission spectrum of double-layer aluminum nano-slit (periodic 430 nm) under the environments of different refractive indexes; (e) relationship of the resonance peak wavelength and the refractive index.

To further confirm the feasibility of applying the scanner and the red, green and blue segment analysis method to the plasmon sensing chip. FIG. 12 (a) shows the detection experiments of different proportions of glycerin/water by using a commercial transmission-type scanner and a double-layer aluminum nano-slit chip (left), and the right side shows the transmission images of the plasmon sub-chips scanned by the scanner in different proportions of glycerin/water, wherein the refractive index of glycerin water is between 1.3290 and 1.346. In this example, in order to allow the resonance peak of the structure to appear in the red and green segments, the period length of the double-layer aluminum nano-slit chip is adjusted to 430 nm.

First, pure water is dropped on the chip, and a cover glass is placed on the chip followed by recording the transmitted image of the chip. Subsequently, the chip was dried and the above steps were repeated with different proportions of glycerin/water, and the images scanning results are shown on the right side of FIG. 12(a). FIG. 12(b) shows the transmission intensity of the structure at different refractive indexes by using the custom equation to analyze the images in the red segment, the green segment, and the red and green segments. As the environmental refractive index increases, the resonance peak at 573 nm generates a red shift, as shown in FIG. 12(d). Since the refractive index has a linear relationship with the peak position, its refractive index sensitivity is 427 nm/RIU (see FIG. 12(e)). This value is close to the theoretical calculation, and its refractive index sensitivity is determined by the length of the period. That is, $S_\lambda \sim P$ nm/RIU. Because the resonance peak shifts to the red segment as the refractive index increases, the transmission strength of the structure in the red segment gradually increases. On the contrary, since the resonance peak gradually moves away from the green segment as the refractive index increases, the transmission strength of the green segment of the structure gradually decreases. As shown in FIG. 12(c), the change of transmission intensity of the two bandwidths is linear relationship with the environmental refractive index, and the slopes corresponding to the red and green segments are 201%/RIU and 56%/RIU, respectively. The intensity change of two color segments based on the custom equation also has a linear relationship with the environmental refractive index, and the intensity sensitivity is 1241%/RIU. Its sensitivity is superior to the other two individual color segment analysis method. Therefore, these results confirm the feasibility of using a scanner and the red, green, and blue segment analysis method for plasmon sensing chip.

What is claimed is:
1. A method for surface plasmon resonance imaging, comprising steps of:
   receiving a first bandwidth plasmon resonance light beam and a second bandwidth plasmon resonance light beam from a surface plasmon resonance sensing chip for generating a first bandwidth surface plasmon image signal and a second bandwidth surface plasmon image signal, respectively; wherein the surface plasmon resonance sensing chip has a surface plasmon resonance wavelength, the surface plasmon resonance wavelength is less than a minimum wavelength of the first bandwidth plasmon resonance light beam and greater than a maximum wavelength of the second bandwidth plasmon resonance light beam, a difference between the surface plasmon resonance wavelength and the minimum wavelength of the first bandwidth plasmon resonance light beam is less than 10 nm, and a difference between the surface plasmon resonance wavelength and the maximum wavelength of the second bandwidth plasmon resonance light beam is less than 10 nm; and receiving the first bandwidth surface plasmon image signal and the second bandwidth surface plasmon image signal for generating a surface plasmon signal image, wherein the surface plasmon signal image is obtained according to an equation of:

$$\text{the surface plasmon signal image} = \frac{\text{first bandwidth surface plasmon image signal} - \text{second bandwidth surface plasmon image signal}}{\text{first bandwidth surface plasmon image signal} + \text{second bandwidth surface plasmon image signal}}.$$

2. A method for surface plasmon resonance imaging, comprising steps of:
receiving a light beam by a surface plasmon resonance sensing chip for generating a plasmon resonance light beam, wherein the light beam normally incidents on the surface plasmon resonance sensing chip;
dividing the plasmon resonance light beam into a first bandwidth plasmon resonance light beam and a second bandwidth plasmon resonance light beam;
receiving the first bandwidth plasmon resonance light beam and the second bandwidth plasmon resonance light beam for generating a first bandwidth surface plasmon image signal and a second bandwidth surface plasmon image signal; and
receiving the first bandwidth surface plasmon image signal and the second bandwidth surface plasmon image signal for generating a surface plasmon signal image, wherein the surface plasmon signal image is obtained according to an equation of:

$$\text{the surface plasmon signal image} = \frac{\text{first bandwidth surface plasmon image signal} - \text{second bandwidth surface plasmon image signal}}{\text{first bandwidth surface plasmon image signal} + \text{second bandwidth surface plasmon image signal}}.$$

3. The method of claim 2, wherein the first bandwidth plasmon resonance light beam is a long-bandwidth surface plasmon image and the second bandwidth plasmon resonance light beam is a short-bandwidth surface plasmon image.

4. An apparatus for surface plasmon resonance imaging, comprising:

an illumination system emitting a light beam;
a surface plasmon resonance sensing chip, wherein the light beam normally incidents on the surface plasmon resonance sensing chip, the surface plasmon resonance sensing chip receives the light beam and generates a plasmon resonance light beam;
an image dividing device dividing the plasmon resonance light beam into a first bandwidth plasmon resonance light beam and a second bandwidth plasmon resonance light beam;
an image device receiving the first bandwidth plasmon resonance light beam and the second bandwidth plasmon resonance light beam at different positions, and generating a first bandwidth surface plasmon image signal and a second bandwidth surface plasmon image signal;
the first bandwidth surface plasmon image signal and the second bandwidth surface plasmon image signal generating a surface plasmon signal image, wherein the surface plasmon signal image is obtained by the image processing according to an equation of:

$$\text{the surface plasmon signal image} = \frac{\text{first bandwidth surface plasmon image signal} - \text{second bandwidth surface plasmon image signal}}{\text{first bandwidth surface plasmon image signal} + \text{second bandwidth surface plasmon image signal}}.$$

5. The apparatus of claim 4, wherein the image dividing device comprises a first bandwidth filter and a second bandwidth filter, the first bandwidth filter and the second bandwidth filter divide the plasmon resonance light beam into the first bandwidth plasmon resonance light beam and the second bandwidth plasmon resonance light beam.

6. The apparatus of claim 4, wherein the image dividing device comprises a light splitter, a first bandwidth filter and a second bandwidth filter, the light splitter receives the plasmon resonance light beam and generates a first split light beam and a second split light beam, the first bandwidth filter receives the first split light beam and generates the first bandwidth plasmon resonance light beam, the second bandwidth filter receives the second split light beam and generates the second bandwidth plasmon resonance light beam.

7. The apparatus of claim 6, wherein the image dividing device further comprises a reflector, the second split light beam is directed towards the reflector and then towards the second bandwidth filter.

8. The apparatus of claim 4, further comprising:
a lens located between the image dividing device and the imaging device, wherein the first bandwidth plasmon resonance light beam and the second bandwidth plasmon resonance light beam pass through the lens and are then projected on the different positions of the imaging device.

9. The apparatus of claim 4, wherein the illumination system is a halogen bulb or a white light emitting diode.

10. The apparatus of claim 4, wherein the imaging device is a CCD camera or CMOS camera.

11. The apparatus of claim 4, wherein the apparatus is applied to a transmission-type scanning device with a nanostructure plasmon sub-biochip.

12. The apparatus of claim 11, wherein the imaging device receives the first bandwidth plasmon resonance light beam and the second bandwidth plasmon resonance light beam with a line-scanning approach.

13. The apparatus of claim 4, wherein the imaging device simultaneously receives the first bandwidth plasmon resonance light beam and the second bandwidth plasmon resonance light beam at the different positions, the position corresponding to the first bandwidth plasmon resonance generates the first bandwidth surface plasmon image signal, the position corresponding to the second bandwidth plasmon resonance generates the second bandwidth surface plasmon image signal.

* * * * *